US012621522B2

(12) United States Patent
Bercovitz et al.

(10) Patent No.: US 12,621,522 B2
(45) Date of Patent: May 5, 2026

(54) DELEGATION WITHIN END TO END ENCRYPTION

(71) Applicant: Verkada Inc., San Mateo, CA (US)

(72) Inventors: Benjamin J. Bercovitz, San Mateo, CA (US); Anurag Arora, Hayward, CA (US); Jingwen Li, Fremont, CA (US); Samuel J. Yuen, Hayward, CA (US); Aleksandr Avseyev, Dublin, CA (US); John Turkson, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 19/310,117

(22) Filed: Aug. 26, 2025

(65) Prior Publication Data

US 2026/0067534 A1     Mar. 5, 2026

Related U.S. Application Data

(60) Provisional application No. 63/688,115, filed on Aug. 28, 2024.

(51) Int. Cl.
H04N 21/4405     (2011.01)
H04L 9/08     (2006.01)
(Continued)

(52) U.S. Cl.
CPC ....... H04N 21/4405 (2013.01); H04L 9/0822 (2013.01); H04N 21/4402 (2013.01); H04N 21/4408 (2013.01)

(58) Field of Classification Search
None
See application file for complete search history.

(56) References Cited

U.S. PATENT DOCUMENTS 6,941,459 B1     9/2005  Hind et al.
6,961,849 B1     11/2005  Davis et al.
(Continued)

OTHER PUBLICATIONS

Apple Security Engineering and Architecture (SEAR) et al., "Private Cloud Compute: A new frontier for AI privacy in the cloud," Apple Security Research, published Jun. 10, 2024 [online] at https://security.apple.com/blog/private-cloud-compute/, [retrieved on Aug. 25, 2025]; 6 pages.

(Continued)

*Primary Examiner* — Omar S Parra
(74) *Attorney, Agent, or Firm* — COOLEY LLP

(57)     ABSTRACT

A method includes receiving, via a processor, a subkey generated concurrently with a video. The video has a first format. A compute device requests the video. The compute device is configured to play videos having a second format. The compute device is not configured to play videos having the first format. The method also includes receiving, via the processor, an encrypted video. The video is encrypted to generate the encrypted video. The method further includes decrypting, via the processor, the encrypted video using the subkey to obtain the video. The method further includes reformatting, via the processor, the video to generate a reformatted video having the second format. The method further includes sending the reformatted video to the second compute device. The method further includes deleting the subkey in response to reformatting the video to generate the reformatted video.

22 Claims, 13 Drawing Sheets

800

Receiving, via a first compute device, from a second compute device, and in response to the second compute device requesting a video, a subkey, the subkey generated concurrently with the video, the video having a first format, the second compute device configured to play videos having a second format, the second compute device not configured to play videos having the first format, the second compute device configured to decrypt an encrypted version of the subkey to obtain the subkey, the first compute device not configured to decrypt the encrypted version of the subkey 802

Receiving an encrypted video including an encrypted version of the video 804

Decrypting the encrypted video using the subkey to obtain the video 806

Reformatting the video to generate a reformatted video having the second format 808

Sending the reformatted video to the second compute device 810

Deleting the subkey in response to reformatting the video to generate the reformatted video 812

(51) Int. Cl.
    *H04N 21/4402*     (2011.01)
    *H04N 21/4408*     (2011.01)

(56)       References Cited

U.S. PATENT DOCUMENTS

| | | |
|---|---|---|
| 6,978,367 B1 | 12/2005 | Hind et al. |
| 7,065,216 B1 | 6/2006 | Benaloh et al. |
| 7,203,317 B2 | 4/2007 | Kallahalla et al. |
| 7,231,517 B1 | 6/2007 | Mashayekhi |
| 7,359,517 B1 | 4/2008 | Rowe |
| 7,986,785 B2 | 7/2011 | Saito |
| 8,082,446 B1 | 12/2011 | Carroll |
| 8,190,921 B1 | 5/2012 | Harwood et al. |
| 8,489,889 B1 | 7/2013 | Moscaritolo et al. |
| 8,532,300 B1 | 9/2013 | Searles |
| 8,914,632 B1 | 12/2014 | Shankar et al. |
| 9,172,532 B1 | 10/2015 | Fuller et al. |
| 9,191,200 B1 | 11/2015 | Adams et al. |
| 9,195,851 B1 | 11/2015 | Chandra |
| 9,205,336 B1 | 12/2015 | Yano |
| 9,240,883 B2 | 1/2016 | Chew |
| 9,270,449 B1 | 2/2016 | Tribble et al. |
| 9,336,092 B1 | 5/2016 | Li |
| 9,397,835 B1 | 7/2016 | Campagna et al. |
| 9,602,283 B1 | 3/2017 | Chandra et al. |
| 9,608,970 B1 | 3/2017 | Gehret et al. |
| 9,673,975 B1 | 6/2017 | Machani |
| 9,722,974 B1 | 8/2017 | Fuller et al. |
| 9,749,299 B1 | 8/2017 | Sokolov et al. |
| 9,762,386 B1 | 9/2017 | Nassaje et al. |
| 9,779,220 B1 | 10/2017 | Kronrod et al. |
| 9,832,171 B1 | 11/2017 | Roth et al. |
| 9,847,979 B2 | 12/2017 | Peterka et al. |
| 9,866,392 B1 | 1/2018 | Campagna et al. |
| 10,263,778 B1 | 4/2019 | Grubin et al. |
| 10,270,587 B1 | 4/2019 | Wu |
| 10,298,551 B1 | 5/2019 | Perlman et al. |
| 10,432,589 B1 | 10/2019 | M'Raihi et al. |
| 10,516,527 B1 | 12/2019 | Machani et al. |
| 10,735,436 B1 | 8/2020 | Chernilovsky et al. |
| 10,903,990 B1 | 1/2021 | Ladd et al. |
| 10,931,450 B1 | 2/2021 | Chellappa et al. |
| 10,979,230 B1 | 4/2021 | Tang |
| 11,062,046 B1 | 7/2021 | Thapar |
| 11,101,999 B2 | 8/2021 | Leavy et al. |
| 11,196,548 B1 | 12/2021 | Buendgen et al. |
| 11,212,264 B1 | 12/2021 | Griffin et al. |
| 11,437,102 B1 | 9/2022 | Cohen et al. |
| 11,444,754 B1 | 9/2022 | Shaked et al. |
| 11,502,827 B1 | 11/2022 | Miller |
| 11,539,512 B2 | 12/2022 | Wall et al. |
| 11,601,402 B1 | 3/2023 | Delaney et al. |
| 11,640,484 B1 | 5/2023 | Kumar |
| 11,658,812 B1 | 5/2023 | Chamorro et al. |
| 11,675,919 B2 | 6/2023 | Ramesh et al. |
| 11,711,755 B1 | 7/2023 | Newman et al. |
| 11,799,633 B1 | 10/2023 | Cartagena et al. |
| 11,886,545 B2 | 1/2024 | Grab et al. |
| 11,895,227 B1 | 2/2024 | Chamorro et al. |
| 12,019,778 B1 | 6/2024 | Bercovitz et al. |
| 2002/0152392 A1 | 10/2002 | Hardy et al. |
| 2005/0018842 A1 | 1/2005 | Fu et al. |
| 2005/0091173 A1 | 4/2005 | Alve |
| 2005/0138382 A1 | 6/2005 | Hougaard et al. |
| 2006/0004662 A1 | 1/2006 | Nadalin et al. |
| 2006/0020786 A1 | 1/2006 | Helms et al. |
| 2006/0093150 A1 | 5/2006 | Reddy et al. |
| 2006/0115085 A1 | 6/2006 | Iwamura |
| 2007/0050696 A1 | 3/2007 | Piersol et al. |
| 2007/0107063 A1 | 5/2007 | Eckleder |
| 2007/0265973 A1 | 11/2007 | Kahn |
| 2007/0280483 A1 | 12/2007 | Fu et al. |
| 2008/0019526 A1 | 1/2008 | Fu et al. |
| 2008/0080708 A1 | 4/2008 | Mcalister et al. |
| 2008/0098212 A1 | 4/2008 | Helms et al. |
| 2008/0189548 A1 | 8/2008 | Steeves et al. |
| 2009/0060178 A1 | 3/2009 | Montgomery et al. |
| 2009/0084713 A1 | 4/2009 | Miller et al. |
| 2009/0154703 A1 | 6/2009 | Price et al. |
| 2009/0157551 A1 | 6/2009 | Bellwood et al. |
| 2009/0208015 A1 | 8/2009 | Kamat et al. |
| 2009/0245517 A1 | 10/2009 | Tinnakornsrisuphap et al. |
| 2009/0271620 A1 | 10/2009 | Sudhakar |
| 2010/0054477 A1 | 3/2010 | Chew |
| 2010/0082989 A1 | 4/2010 | Bussard et al. |
| 2010/0166189 A1 | 7/2010 | Morohoshi et al. |
| 2010/0169669 A1 | 7/2010 | Smith |
| 2010/0191772 A1 | 7/2010 | Brown et al. |
| 2011/0055560 A1 | 3/2011 | Meissner et al. |
| 2011/0082798 A1 | 4/2011 | Michaud et al. |
| 2011/0235801 A1 | 9/2011 | Peterka et al. |
| 2011/0261959 A1 | 10/2011 | Joseph et al. |
| 2011/0283113 A1 | 11/2011 | Moffat et al. |
| 2011/0293096 A1 | 12/2011 | Reilly et al. |
| 2012/0117232 A1 | 5/2012 | Brown et al. |
| 2012/0173885 A1 | 7/2012 | Acar et al. |
| 2012/0213370 A1 | 8/2012 | Moskovics et al. |
| 2012/0221659 A1 | 8/2012 | Brown et al. |
| 2012/0275596 A1 | 11/2012 | Ureche et al. |
| 2012/0317414 A1 | 12/2012 | Glover |
| 2013/0070923 A1 | 3/2013 | Kang et al. |
| 2013/0110728 A1 | 5/2013 | Kobres |
| 2013/0111208 A1 | 5/2013 | Sabin et al. |
| 2013/0173915 A1 | 7/2013 | Haulund |
| 2013/0233916 A1 | 9/2013 | Tran |
| 2013/0254536 A1 | 9/2013 | Glover |
| 2014/0032900 A1 | 1/2014 | Donahue |
| 2014/0037093 A1 | 2/2014 | Park et al. |
| 2014/0093079 A1 | 4/2014 | Scott et al. |
| 2014/0108810 A1 | 4/2014 | Chenna |
| 2014/0122884 A1 | 5/2014 | Pieczul et al. |
| 2014/0122894 A1 | 5/2014 | Sakumoto et al. |
| 2014/0223175 A1 | 8/2014 | Bhatnagar |
| 2014/0237261 A1 | 8/2014 | Diep et al. |
| 2014/0245388 A1 | 8/2014 | Nako |
| 2014/0258707 A1 | 9/2014 | Denny |
| 2014/0281574 A1 | 9/2014 | Webb |
| 2014/0337634 A1 | 11/2014 | Starner et al. |
| 2015/0100780 A1 | 4/2015 | Rubin et al. |
| 2015/0278531 A1 | 10/2015 | Smith et al. |
| 2015/0319166 A1 | 11/2015 | Arnold et al. |
| 2016/0006716 A1 | 1/2016 | Rothberg |
| 2016/0065540 A1 | 3/2016 | Androulaki et al. |
| 2016/0134599 A1 | 5/2016 | Ross et al. |
| 2016/0154963 A1 | 6/2016 | Kumar et al. |
| 2016/0188889 A1 | 6/2016 | Narendra Trivedi et al. |
| 2016/0300068 A1 | 10/2016 | Gillespie et al. |
| 2016/0307194 A1 | 10/2016 | Bhatnagar et al. |
| 2016/0308678 A1 | 10/2016 | Bhatnagar |
| 2016/0323108 A1 | 11/2016 | Bhogal et al. |
| 2016/0352518 A1 | 12/2016 | Ford et al. |
| 2016/0365976 A1 | 12/2016 | Yamaguchi |
| 2017/0019382 A1 | 1/2017 | Jain et al. |
| 2017/0094514 A1 | 3/2017 | Kelts et al. |
| 2017/0099268 A1 | 4/2017 | Camenisch et al. |
| 2017/0103025 A1 | 4/2017 | Meyer et al. |
| 2017/0104593 A1 | 4/2017 | Vo et al. |
| 2017/0126408 A1 | 5/2017 | Van Someren |
| 2017/0206532 A1 | 7/2017 | Choi |
| 2017/0318263 A1 | 11/2017 | Cocchi et al. |
| 2017/0331628 A1 | 11/2017 | Adams et al. |
| 2017/0357822 A1 | 12/2017 | Wei et al. |
| 2018/0026949 A1 | 1/2018 | Kimn et al. |
| 2018/0041341 A1 | 2/2018 | Gulati |
| 2018/0119975 A1 | 5/2018 | Park et al. |
| 2018/0144656 A1 | 5/2018 | Mitros |
| 2018/0145831 A1 | 5/2018 | Garagnon et al. |
| 2018/0157840 A1 | 6/2018 | Crowley |
| 2018/0262337 A1 | 9/2018 | Zubov et al. |
| 2018/0323970 A1 | 11/2018 | Maron et al. |
| 2019/0103965 A1 | 4/2019 | Roake et al. |
| 2019/0132133 A1 | 5/2019 | Druker |
| 2019/0190704 A1 | 6/2019 | Srivastava et al. |
| 2019/0207913 A1 | 7/2019 | Hwang et al. |

(56) References Cited

U.S. PATENT DOCUMENTS

| | | | |
|---|---|---|---|
| 2019/0228140 A1 | 7/2019 | Arroyo et al. | |
| 2019/0236022 A1 | 8/2019 | Gopal et al. | |
| 2019/0238331 A1 | 8/2019 | Chandra et al. | |
| 2019/0244215 A1 | 8/2019 | Watanabe et al. | |
| 2019/0274612 A1 | 9/2019 | Chavez, Jr. | |
| 2019/0274613 A1 | 9/2019 | Chavez, Jr. | |
| 2019/0334884 A1 | 10/2019 | Ross et al. | |
| 2019/0356649 A1 | 11/2019 | Alwen et al. | |
| 2019/0370478 A1 | 12/2019 | Boccon-Gibod et al. | |
| 2020/0007931 A1* | 1/2020 | Ho | G06N 20/00 |
| 2020/0012763 A1 | 1/2020 | Arngren et al. | |
| 2020/0076807 A1 | 3/2020 | Driever et al. | |
| 2020/0125742 A1 | 4/2020 | Kounavis et al. | |
| 2020/0134234 A1 | 4/2020 | LeMAY et al. | |
| 2020/0280544 A1 | 9/2020 | Sivaraman et al. | |
| 2020/0342117 A1 | 10/2020 | Richards et al. | |
| 2020/0344062 A1 | 10/2020 | Haldar et al. | |
| 2020/0374274 A1 | 11/2020 | Momchilov et al. | |
| 2020/0389328 A1 | 12/2020 | Wu | |
| 2020/0410113 A1 | 12/2020 | Gryb et al. | |
| 2021/0014217 A1 | 1/2021 | Wei et al. | |
| 2021/0034760 A1 | 2/2021 | Banga | |
| 2021/0042448 A1 | 2/2021 | Jeon et al. | |
| 2021/0056214 A1 | 2/2021 | Bursell et al. | |
| 2021/0058242 A1 | 2/2021 | Donsomsakunkij et al. | |
| 2021/0067328 A1 | 3/2021 | Verheyen | |
| 2021/0085988 A1 | 3/2021 | Nin et al. | |
| 2021/0124818 A1 | 4/2021 | Muthukumaran et al. | |
| 2021/0133729 A1 | 5/2021 | Murao et al. | |
| 2021/0143983 A1 | 5/2021 | Lidzborski et al. | |
| 2021/0144002 A1 | 5/2021 | Aronesty et al. | |
| 2021/0157904 A1 | 5/2021 | Bursell et al. | |
| 2021/0176050 A1 | 6/2021 | Lidzborski et al. | |
| 2021/0176053 A1 | 6/2021 | Santos et al. | |
| 2021/0217006 A1 | 7/2021 | Ragavan et al. | |
| 2021/0218555 A1 | 7/2021 | Mastenbrook et al. | |
| 2021/0243018 A1 | 8/2021 | Jacobs et al. | |
| 2021/0264799 A1 | 8/2021 | Belt et al. | |
| 2021/0271763 A1 | 9/2021 | Perlman et al. | |
| 2021/0306149 A1 | 9/2021 | Griera | |
| 2021/0306150 A1 | 9/2021 | Connard et al. | |
| 2021/0328974 A1 | 10/2021 | Grooters | |
| 2021/0344485 A1 | 11/2021 | Levin et al. | |
| 2021/0349986 A1 | 11/2021 | Jiang et al. | |
| 2021/0390189 A1 | 12/2021 | Nagao et al. | |
| 2021/0397425 A1 | 12/2021 | Zwarich et al. | |
| 2021/0399880 A1 | 12/2021 | Gupta et al. | |
| 2022/0006613 A1 | 1/2022 | Hetzler | |
| 2022/0014918 A1 | 1/2022 | Mastenbrook et al. | |
| 2022/0029820 A1 | 1/2022 | Mozano et al. | |
| 2022/0044506 A1 | 2/2022 | Dewey et al. | |
| 2022/0069981 A1 | 3/2022 | Jog et al. | |
| 2022/0100822 A1 | 3/2022 | Simioni et al. | |
| 2022/0116367 A1 | 4/2022 | Gordon | |
| 2022/0129443 A1 | 4/2022 | Nadeau et al. | |
| 2022/0150224 A1 | 5/2022 | Courtney | |
| 2022/0173894 A1 | 6/2022 | Cain, Jr. et al. | |
| 2022/0173904 A1 | 6/2022 | Kesari | |
| 2022/0191039 A1 | 6/2022 | Kisley et al. | |
| 2022/0198027 A1 | 6/2022 | Chhabra et al. | |
| 2022/0200800 A1 | 6/2022 | Xu et al. | |
| 2022/0207114 A1 | 6/2022 | Pfeifer et al. | |
| 2022/0237282 A1 | 7/2022 | Tzur-David et al. | |
| 2022/0237329 A1 | 7/2022 | Dahiya et al. | |
| 2022/0261157 A1 | 8/2022 | Rao et al. | |
| 2022/0263657 A1 | 8/2022 | Chang et al. | |
| 2022/0292622 A1 | 9/2022 | Soscia | |
| 2022/0311620 A1 | 9/2022 | Saha et al. | |
| 2022/0321331 A1 | 10/2022 | Kisley et al. | |
| 2022/0321339 A1 | 10/2022 | Yedluri et al. | |
| 2022/0327249 A1 | 10/2022 | Kulkarni et al. | |
| 2022/0329433 A1 | 10/2022 | Doshi et al. | |
| 2022/0366429 A1 | 11/2022 | Pati et al. | |
| 2022/0368681 A1 | 11/2022 | Nomani et al. | |
| 2022/0385464 A1 | 12/2022 | Anand et al. | |
| 2022/0385643 A1 | 12/2022 | Movva et al. | |
| 2022/0385646 A1 | 12/2022 | Basu et al. | |
| 2022/0385649 A1 | 12/2022 | Basu et al. | |
| 2022/0399995 A1 | 12/2022 | Moon | |
| 2022/0400006 A1 | 12/2022 | Hunsberger et al. | |
| 2022/0400102 A1 | 12/2022 | Moon | |
| 2022/0414261 A1 | 12/2022 | Thapar | |
| 2023/0012013 A1 | 1/2023 | Livshin et al. | |
| 2023/0059173 A1 | 2/2023 | Moon | |
| 2023/0063632 A1 | 3/2023 | Robinson-Morgan et al. | |
| 2023/0065676 A1 | 3/2023 | Obstfeld et al. | |
| 2023/0068317 A1 | 3/2023 | Ranha et al. | |
| 2023/0078187 A1 | 3/2023 | Kennedy et al. | |
| 2023/0126961 A1 | 4/2023 | Leong et al. | |
| 2023/0162234 A1 | 5/2023 | Ramirez | |
| 2023/0163981 A1 | 5/2023 | Subramanian | |
| 2023/0205908 A1 | 6/2023 | Kostushko et al. | |
| 2023/0208821 A1 | 6/2023 | Wu et al. | |
| 2023/0247010 A1 | 8/2023 | O'Connell et al. | |
| 2023/0254134 A1 | 8/2023 | Burnett et al. | |
| 2023/0259899 A1 | 8/2023 | Albert et al. | |
| 2023/0269690 A1 | 8/2023 | Ramezan et al. | |
| 2023/0291548 A1 | 9/2023 | Mastenbrook et al. | |
| 2023/0291565 A1 | 9/2023 | Ureche et al. | |
| 2023/0385428 A1 | 11/2023 | Stahlberg et al. | |
| 2023/0412374 A1 | 12/2023 | Hohner et al. | |
| 2023/0421373 A1 | 12/2023 | Ryan et al. | |
| 2024/0022405 A1 | 1/2024 | Sood et al. | |
| 2024/0028758 A1 | 1/2024 | Wall et al. | |
| 2024/0046268 A1 | 2/2024 | Strealy | |
| 2024/0073013 A1 | 2/2024 | Lal et al. | |
| 2024/0080315 A1 | 3/2024 | Ravuna et al. | |
| 2024/0146717 A1 | 5/2024 | Vijayasankar et al. | |
| 2024/0193603 A1 | 6/2024 | Wolfs et al. | |
| 2024/0205012 A1 | 6/2024 | Jordan et al. | |
| 2024/0242255 A1 | 7/2024 | Blumenfeld et al. | |
| 2024/0256105 A1 | 8/2024 | Yu et al. | |
| 2024/0311750 A1 | 9/2024 | Goeters et al. | |
| 2025/0005172 A1 | 1/2025 | Ryoo et al. | |
| 2025/0165636 A1 | 5/2025 | Bercovitz et al. | |

OTHER PUBLICATIONS

Buddhavarapu, P. et al., "Delegated Multi-key Private Matching forCompute: Improving match rates andenabling adoption," Meta Technology Company, published Jan. 30, 2023 [online] at https://research.facebook.com/blog/2023/1/delegated-multi-key-private-matching-for-compute-improving-match-rates-and-enabling-adoption/, [retrieved on Apr. 3, 2024]; 18 pages.

Chang, Y-C. et al., "Secure Transcoding of Internet Content," Journal of Computer Information Systems, Feb. 2022; 4 pages.

Hamad, M. et al., "SEEMQTT: Secure End-to-End MQTT-Based Communication for Mobile IoT Systems Using Secret Sharing and Trust Delegation," IEEE Internet of Things Journal, [Epub Nov. 14, 2022]; Feb. 15, 2023, 10(4):3384-3406.

Hollister, S. "Anker finally comes clean about its Eufy security cameras," The Verge Technology News Website, published Jan. 31, 2023 [online] at https://www.theverge.com/23573362/anker-eufy-security-camera-answers-encryption, [retrieved on Aug. 25, 2025]; 9 pages.

Kumar, S et al., "JEDI: Many-to-Many End-to-End Encryption and Key Delegation for IoT," 28th USENIX Security Symposium, Santa Clara, CA, USA, [Date of Symposium: Aug. 14-16, 2019], pp. 1519-1536; 19 pages (with coversheet).

1Password, "About 1Password Unlock with SSO security," 1password.com, published Sep. 5, 2023 [online]. Retrieved on Oct. 26, 2023 from Internet at URL: https://support.1 password.com/sso-security/; 5 pages.

Blum, J. et al., "Zoom Cryptography Whitepaper," Zoom Video Communications, Inc., (Mar. 27, 2023); Version 4.1, CC BY-SA 4.0; 79 pages.

Blum, J. et al., "Zoom Cryptography Whitepaper," Zoom Video Communications, Inc., (Nov. 21, 2023), Version 4.3, CC BY-SA 4.0; 85 pages.

(56)                References Cited

OTHER PUBLICATIONS

Google Cloud, "Google Cloud Whitepaper: How Google Workspace uses encryption to protect your data," Service.google.com, published Aug. 2020 [online]. Retrieved on Feb. 15, 2024 from the Internet at URL: https://services.google.com/fh/files/helpcenter/google_encryptionwp2016.pdf; 14 pages.
Google Workspace, "Google Workspace Encryption Whitepaper: How Google Workspace uses encryption to protect your data," Service.google.com, published Jun. 2021 [online]. Retrieved on Feb. 15, 2024 from the Internet at URL: https://services.google.com/fh/files/misc/google-workspace-encryption-wp.pdf; 19 pages.
Hu, V. C. "Overview and Considerations of Access Control Based on Attribute Encryption," National Institute of Standards and Technology (NIST), NIST Internal Report: NIST IR 8450-upd1, (Sep. 2023); 41 pages.
Kaur, Y. "Introducing Unlock with Okta for 1Password Business," Blog.1Password.com, published Mar. 8, 2023 [online]. Retrieved on Oct. 26, 2023 from Internet at URL: https://blog.1 password.com/unlock-with-okta/; 4 pages.
PCT Application No. PCT /US2025/043492, International Search Report and Written Opinion mailed Nov. 18, 2025; Applicant Verkada Inc.; 15 pages.
PCT Application No. PCT/US2024/054367, International Search Report and Written Opinion mailed Jan. 27, 2025; Applicant Verkada Inc.; 13 pages.

Perlow, J. "Linux Foundation, BastionZero and Docker Announce the Launch of the OpenPubkey Project," Linuxfoundation.org, published Oct. 4, 2023 [online]. Retrieved on Oct. 26, 2023 from Internet at URL: https://www.linuxfoundation.org/press/announcing-openpubkey-project; 4 pages.
Skiff, "End-to-end encrypted, Privacy-FirstWorkspace," https://skiff-org.github.io/, (Dec. 2022). Retrieved on Feb. 15, 2023 from the Internet at URL: https://skiff-org.github.io/whitepaper/Skiff_Whitepaper_2022.pdf, accessed Feb. 15, 2023; 9 pages.
U.S. Appl. No. 18/518,343, Notice of Allowance mailed Feb. 14, 2023; Inventor Bercovitz, Benjamin J. et al.; 21 pages.
U.S. Appl. No. 18/737,146, Final Office Action mailed Nov. 15, 2024; Inventor Bercovitz, Benjamin J. et al.; 17 pages.
U.S. Appl. No. 18/737,146, Non-Final Office Action mailed Aug. 6, 2024; Inventor Bercovitz, Benjamin J. et al.; 16 pages.
U.S. Appl. No. 18/737,146, Non-Final Office Action mailed Mar. 25, 2025; Inventor Bercovitz, Benjamin J. et al.; 14 pages.
U.S. Appl. No. 18/737,146, Notice of Allowance mailed Sep. 10, 2025; Inventor Bercovitz, Benjamin J. et al.; 10 pages.
Whatsapp, "WhatsApp Encryption Overview," Technical white paper, Version 6, (Jan. 24, 2023). Retrieved on Feb. 15, 2024 from the Internet at URL: https://www.scribd.com/document/628464023/328619852-1611854775910507-3217786758896242477-n-1; 29 pages.

* cited by examiner

Key key

= camera key

= a recipient key

= media key

 = rule(s)

recipient key enclave enforces
expiration of media
w.r.t. cloud encryption using
recipient key media keys e.g cv, ai
process System decryption for background processing encryption using
media key encryption using
recipient key media keys storage encryption using
recipient key encryption
using
camera key media keys encryption using
recipient key encryption using
media key camera

FIG. 3

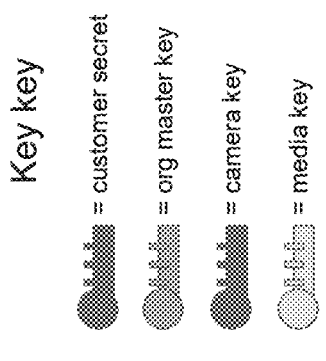
FIG. 4

700

Generate encrypted video 702

Request encrypted video 704

Generate subkey 706

Decrypt encrypted video and convert into a reformatted video 708

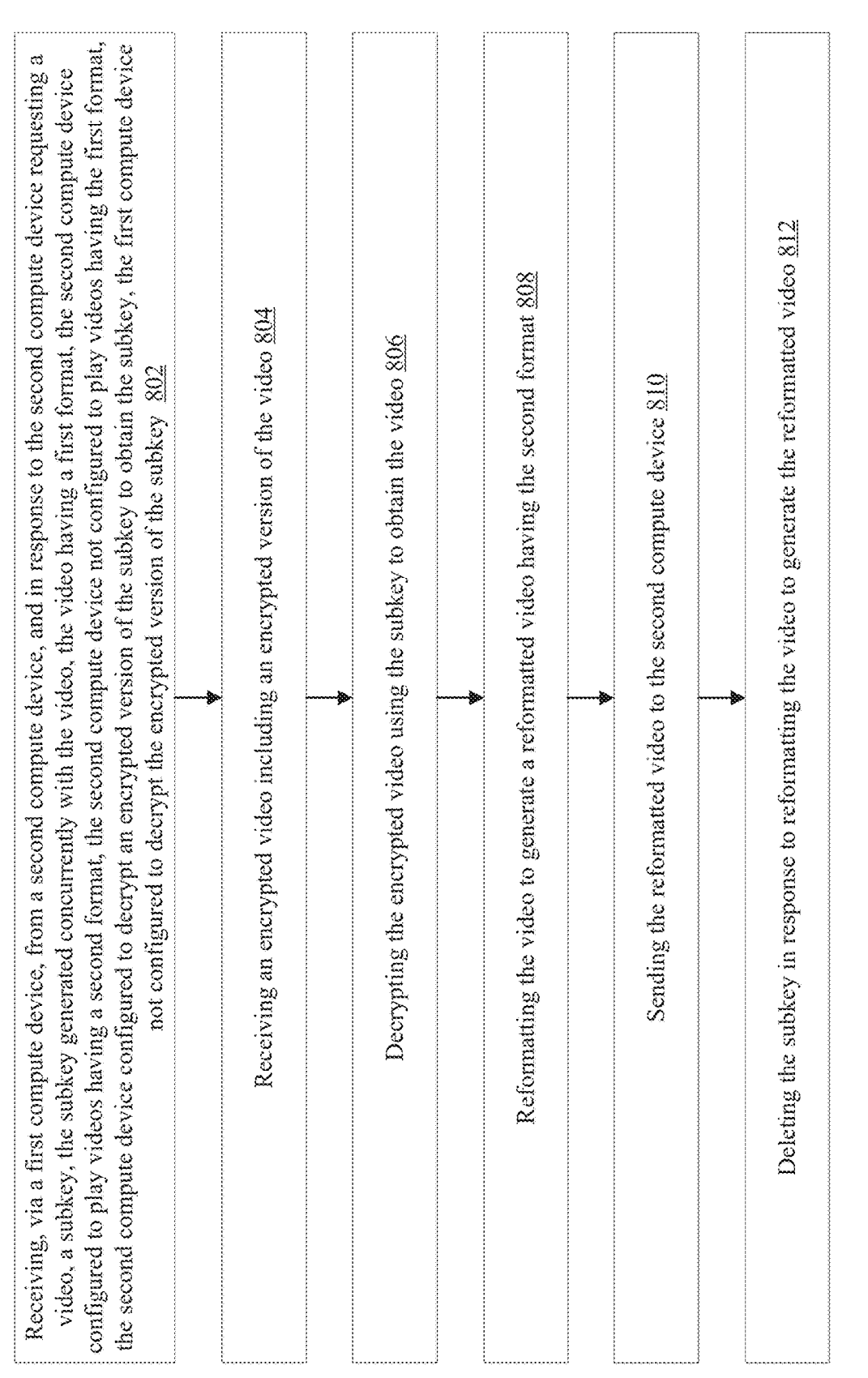

800

Receiving, via a first compute device, from a second compute device, and in response to the second compute device requesting a video, a subkey, the subkey generated concurrently with the video, the video having a first format, the second compute device configured to play videos having a second format, the second compute device not configured to play videos having the first format, the second compute device configured to decrypt an encrypted version of the subkey to obtain the subkey, the first compute device not configured to decrypt the encrypted version of the subkey 802

Receiving an encrypted video including an encrypted version of the video 804

Decrypting the encrypted video using the subkey to obtain the video 806

Reformatting the video to generate a reformatted video having the second format 808

Sending the reformatted video to the second compute device 810

Deleting the subkey in response to reformatting the video to generate the reformatted video 812

FIG. 7

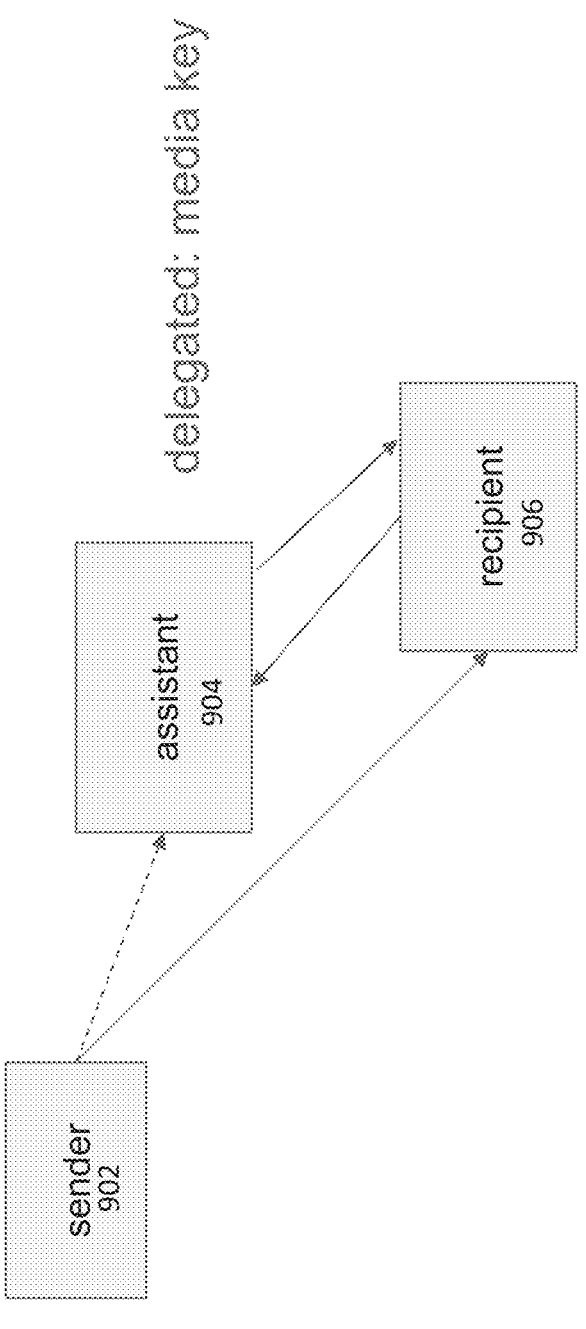
FIG. 8

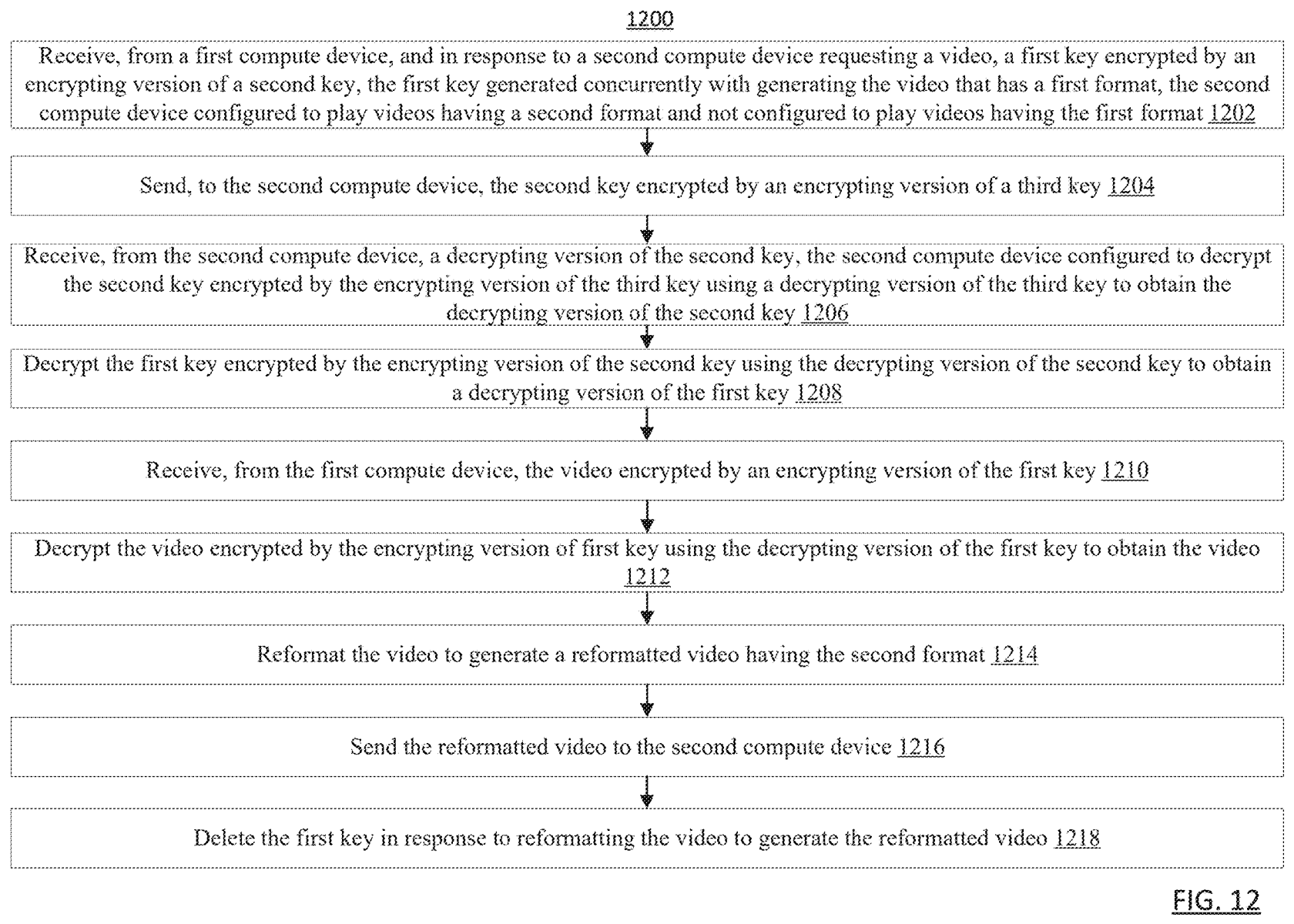

1200

Receive, from a first compute device, and in response to a second compute device requesting a video, a first key encrypted by an encrypting version of a second key, the first key generated concurrently with generating the video that has a first format, the second compute device configured to play videos having a second format and not configured to play videos having the first format 1202

Send, to the second compute device, the second key encrypted by an encrypting version of a third key 1204

Receive, from the second compute device, a decrypting version of the second key, the second compute device configured to decrypt the second key encrypted by the encrypting version of the third key using a decrypting version of the third key to obtain the decrypting version of the second key 1206

Decrypt the first key encrypted by the encrypting version of the second key using the decrypting version of the second key to obtain a decrypting version of the first key 1208

Receive, from the first compute device, the video encrypted by an encrypting version of the first key 1210

Decrypt the video encrypted by the encrypting version of first key using the decrypting version of the first key to obtain the video 1212

Reformat the video to generate a reformatted video having the second format 1214

Send the reformatted video to the second compute device 1216

Delete the first key in response to reformatting the video to generate the reformatted video 1218

FIG. 12

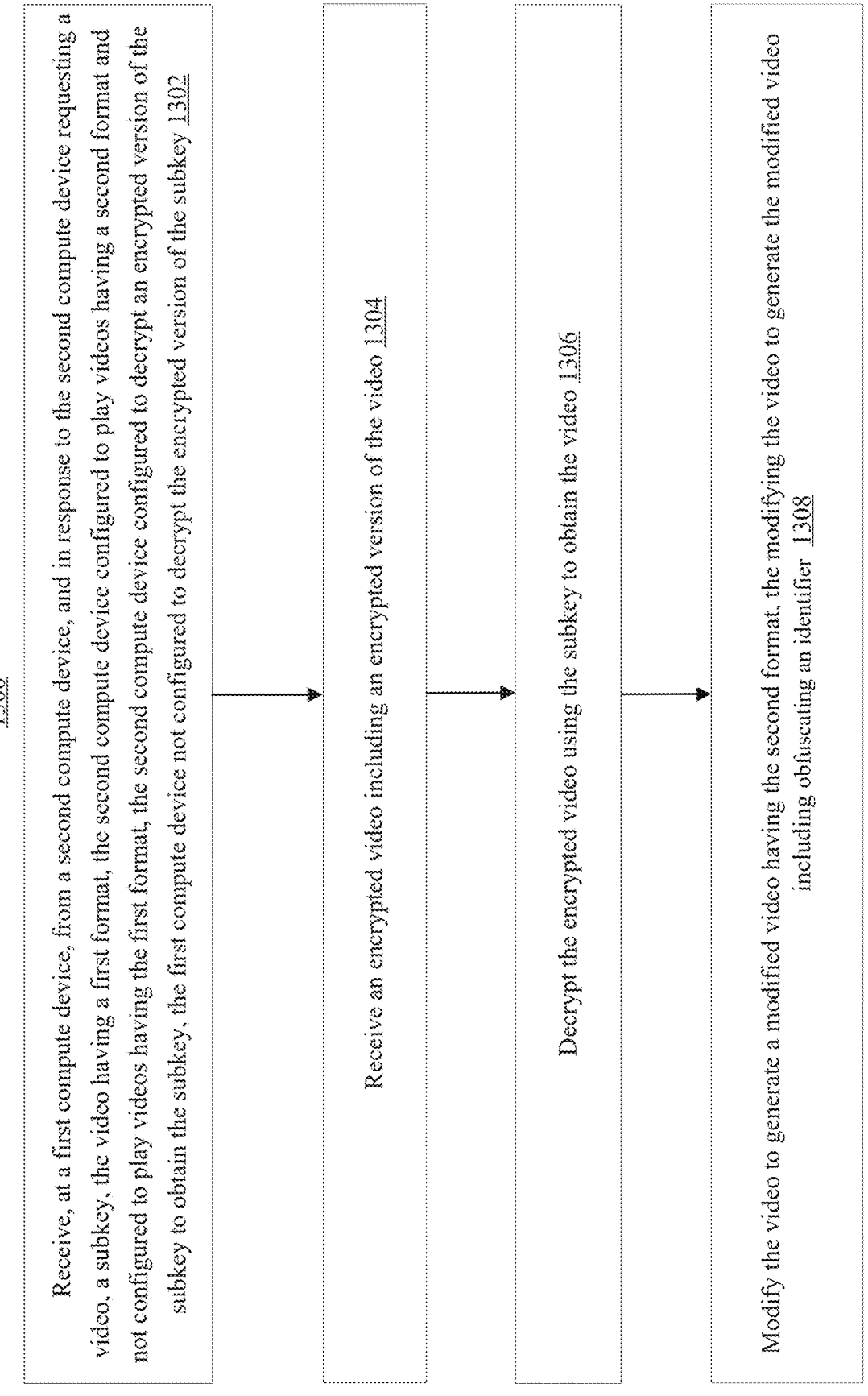

1300

Receive, at a first compute device, from a second compute device, and in response to the second compute device requesting a video, a subkey, the video having a first format, the second compute device configured to play videos having a second format and not configured to play videos having the first format, the second compute device configured to decrypt an encrypted version of the subkey to obtain the subkey, the first compute device not configured to decrypt the encrypted version of the subkey 1302

Receive an encrypted video including an encrypted version of the video 1304

Decrypt the encrypted video using the subkey to obtain the video 1306

Modify the video to generate a modified video having the second format, the modifying the video to generate the modified video including obfuscating an identifier 1308

FIG. 13

DELEGATION WITHIN END TO END ENCRYPTION

CROSS REFERENCE TO RELATED APPLICATION

This application claims priority to U.S. Provisional Patent Application No. 63/688,115, filed Aug. 28, 2024 and titled "DELEGATION WITHIN END TO END ENCRYPTION," the contents of which are incorporated by reference herein in their entirety.

FIELD

One or more embodiments are related to a system and method for performing delegated end to end encryption.

BACKGROUND

Where data is exchanged amongst compute devices, limiting compute devices' access to that data and/or other data can be desirable in at least some situations.

SUMMARY

In an embodiment, a method includes receiving, via a processor of a first compute device, from a second compute device, and in response to the second compute device requesting a video, a subkey generated concurrently with (or overlapping in time with) the video. The video has a first format. The second compute device is configured to play videos having a second format. The second compute device is not configured to play videos having the first format. The second compute device is configured to decrypt an encrypted version of the subkey to obtain the subkey. The first compute device is not configured to decrypt the encrypted version of the subkey. The method further includes receiving, via the processor, an encrypted video including an encrypted version of the video. The method further includes decrypting, via the processor, the encrypted video using the subkey to obtain the video. The method further includes reformatting the video, via the processor, to generate a reformatted video having the second format. The method further includes sending the reformatted video to the second compute device. The method further includes deleting the subkey in response to reformatting the video to generate the reformatted video.

In an embodiment, a first key encrypted by an encryption version of a second key is received from a first compute device and in response to a second compute device requesting a video. The first key is generated concurrently with (or overlapping in time with) generating the video that has a first format. The second compute device is configured to play videos having a second format. The second compute device is not configured to play videos having the first format. The second key encrypted by an encrypting version of a third key is sent to the second compute device. A decrypting version of the second key is received from the second compute device. The second compute device is configured to decrypt the second key encrypted by the encrypting version of the third key using a decrypting version of the third key to obtain the decrypting version of the second key. The first key encrypted by the encrypting version of the second key is decrypted using the decrypting version of the second key to obtain a decrypting version of the first key. The video encrypted by an encrypting version of the first key is received from the first compute device. The video encrypted by the encrypting version of first key is decrypted using the decrypting version of the first key to obtain the video. The video is reformatted to generate a reformatted video having the second format. The reformatted video is sent to the second compute device. The first key is deleted in response to reformatting the video to generate the reformatted video.

In an embodiment, a subkey is received at a first compute device, from a second compute device, and in response to the second compute device requesting a video. The video has a first format. The second compute device is configured to play videos having the second format. The second compute device is not configured to play videos having the first format. The second compute device is configured to decrypt an encrypted version of the subkey to obtain the subkey. The first compute device is not configured to decrypt the encrypted version of the subkey. An encrypted video including an encrypted version of the video is received. The encrypted video is decrypted using the subkey to obtain the video. The video is modified to generate a modified video. The modified video has the second format. Modifying the video to generate the modified video includes obfuscating an identifier.

BRIEF DESCRIPTION OF THE DRAWINGS

FIG. 3 illustrates a process to decrypt for background processing, according to an embodiment.

FIG. 4 illustrates a process to transcode a video, according to an embodiment.

FIG. 7 shows a flowchart of a method for a delegated compute device to use a subkey, according to an embodiment.

FIG. 8 illustrates a delegation system that does not include an agent, according to an embodiment.

FIG. 12 shows a flowchart of a method for a delegated compute device to use a subkey, according to an embodiment.

FIG. 13 shows a flowchart of a method to generate a modified video, according to an embodiment.

DETAILED DESCRIPTION

Figure 1:
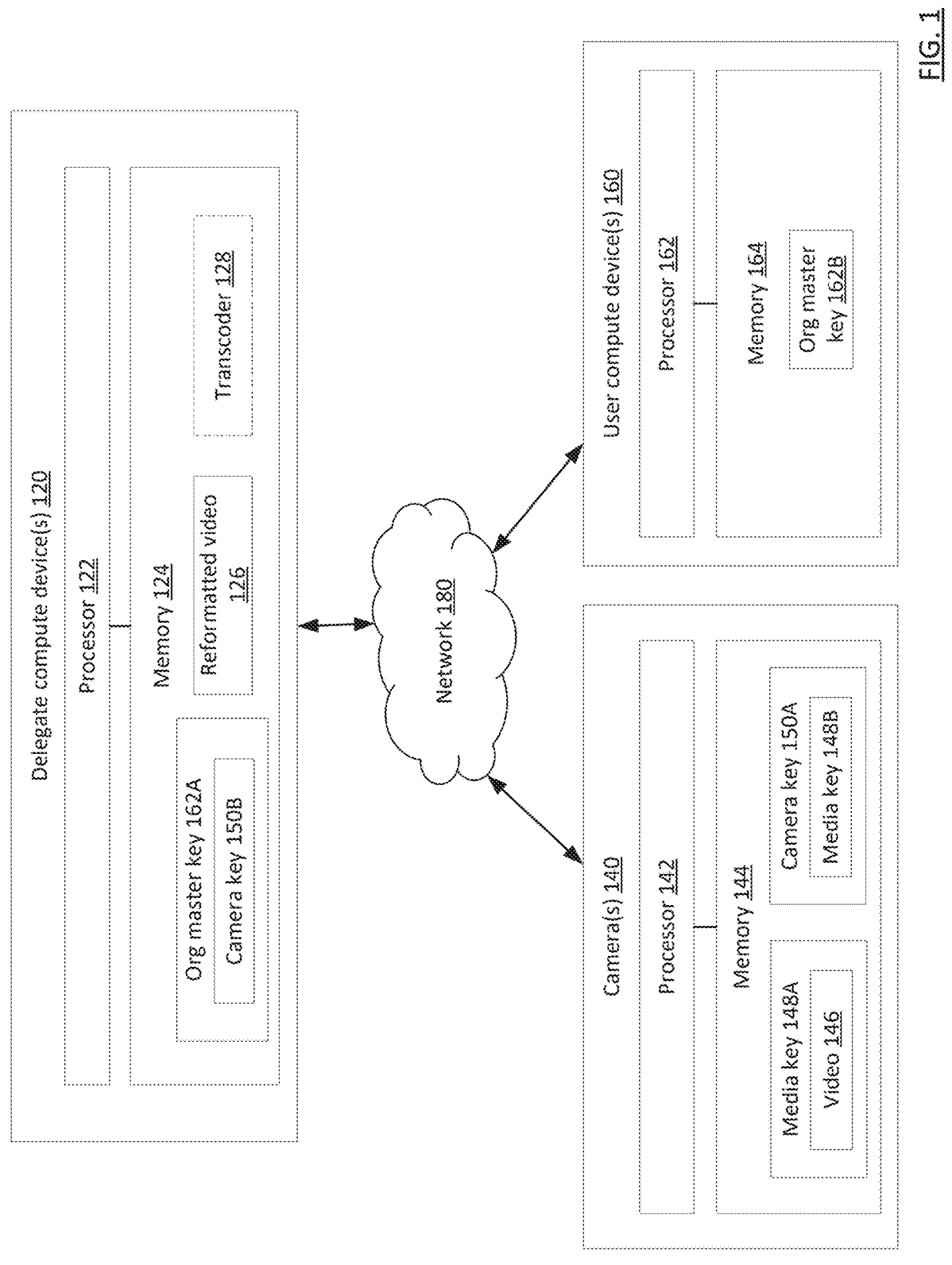
FIG. 1 shows a block diagram of a system for performing delegated end to end encryption, according to an embodiment.

In some known computing environments, such as those involving secure video data exchange, a persistent challenge arises when a user device cannot natively play or process encrypted media due to, for example, format incompatibility. Known end-to-end encryption schemes lack the flexibility to delegate specific tasks—such as transcoding or augmentation—to third-party compute devices without compromising data confidentiality. As such, secure, format-compatible media playback on constrained devices that limit exposure of sensitive encryption keys or broader datasets to intermediary systems can be desirable. Accordingly, one or more embodiments disclosed herein relate to a delegated end-to-end encryption system that uses subkeys. These subkeys allow a delegate compute device to decrypt and reformat a requested video into a compatible format for the user device, while strictly limiting the delegate compute device's access to only the requested content. The subkeys can be ephemeral, tightly scoped to individual media segments, and/or automatically destroyed after use, ensuring that the delegate compute device cannot access other encrypted data. This enables seamless, compatible, secure, on-demand media transformation and delivery while only selectively affecting the integrity of the end-to-end encryption model on an as-needed or as-desired basis.

In some implementations, a video (e.g., that captures, generates, or renders sequences of images and can optionally be accompanied by audio or interactive elements like augmented or virtual reality) having a first format is captured, but a first compute device requesting to open and/or play the video—though able to play videos having a second format—is not configured to play videos having the first format (e.g., due to the video player at the first compute device not supporting the file type of the first format, due to the first compute device not having a codec to decode the video in the first format, due to the video in the first format being corrupted, etc.). The first compute device can also not be configured to convert videos having the first format into a second format that is playable by the first compute device (e.g., due to the first compute device not including software to support conversion, due to the conversion requiring more memory and/or processing power than is available at the first compute device, etc.). A second compute device, however, is able to convert videos having the first format into the second format. In such a situation, it can be desirable to let the second compute device convert the video having the first format into a video having the second format while also limiting (e.g., for privacy or security reasons) the second compute device's access to certain data, such as other videos.

Some implementations are related to "delegated end to end encryption," or the delegation of tasks to one or more compute devices that are not originally party to or participating within an end to end encryption communication environment/channel. In some implementations, a first compute device—compute device A—and a second compute device—compute device B—have a secure end to end encrypted channel, and compute devices A and B both have (e.g., store in memory) a key that no one else (e.g., no other compute device) has; said differently, compute devices A and B are in communication with one another over an end to end encrypted channel, facilitated by the shared key. Compute device A has (e.g., stores in memory) a video V that is incompatible with (e.g., not playable on, not readable by, etc.) compute device B, such that computer device B cannot play the video V. Compute device B can, however, play a differently formatted version of the video V (i.e., video V1). A server X is able to convert video V to video V1, but sending the shared key that only compute devices A and B both have to server X can be undesirable (e.g., the shared key can provide server X access to confidential data). Accordingly, in some implementations, one or more subkeys are created, and each subkey can be assigned to an individual video such that subsequent delegation of very fine permission(s) (e.g., to the server X) can occur using these subkeys. Optionally, a subkey for video V can only be delegated to server X in response to video V (or its different format, e.g. video V1) being requested by compute device B.

In some implementations, when the playback application (e.g., browser) is closed/exited/terminated, "permission" is closed (e.g., additional subkeys cannot be induced to be decrypted by the backend after the client browser is terminated). In other words, additional delegation cannot occur after the playback application (e.g., browser) is closed (though any previous delegations before the browser closed are not automatically terminated upon the browser closing). Alternatively or in addition, in some implementations, delegation of a subkey grants/further guarantees some limited permission(s) (e.g., one or more of: limited in content, limited in time, limited to a user, etc.) through delegation processing by automatic timed destruction of the subkey at the delegate (e.g., server X). Alternatively or in addition, in some implementations, when compute device B does not attempt to open the video V (or its different format, e.g. video V1), then no subkey associated with video V is delegated to server X. Some implementations include the transcoding of video to resolve compatibility issues with compute devices (and/or browsers thereof) that are not "standard-compliant" or that are unable to play the video in its native or originally-recorded format.

In some implementations, a subkey is different than a key pair (e.g., key pair can be a shared key between camera(s) 140 and user compute device(s) 160 of FIG. 1). A subkey can be assigned/bound to a key pair and not to an individual per se. An individual can have a unique key pair, which in turn can have/be associated with unique subkeys. In some implementations, a subkey as used herein is different than a subkey associated with the OpenPGP™ standard. In some implementations, techniques described herein are different than the OpenPGP™ standard. In some implementations, the terms "subkey" and "media key" are used interchangeably herein.

In some implementations, unlike OpenPGP™, and considering parties A and B, party A can choose to use party B's subkey instead of their main key to communicate with party B. The subkey encrypts a message-specific key. Party A only needs to trust party A's main key. The key trust process in OpenPGP™ is expensive so changing the main key is undesirable. Subkeys help avoid this.

In other implementations, given parties A and B, party A can use party B's main (and only) key to communicate with party B. The main key directly encrypts the message-specific (media) key. Party B, however, upon receiving the message and decrypting it with the message-specific key, cannot understand the message content. Party B can involve a party C but party C cannot be fully trusted with party B's main key. Party B can share the message key, but the message key can be reused across a range of data so the number of message key decryptions to access a range of messages is limited. Party C can further access as proxy the message itself, receiving the message directly from party A, presenting the message key to party B, receiving the decrypted message key from party B, then transforming the message and returning the transformed message to party B. This avoids sending un-understandable message content to party B. Multiple messages can have the same message key to reduce (e.g., minimize) the number of times party B decrypts a message key to receive further messages. The message key can map to a logical group of messages (e.g., limited time range, limited audience, limited subject matter) to match other access or authorization limitations implemented by party C. Party C, as proxy, can receive messages encrypted by a message key decryptable by party B but may not forward them to party B as a form of data access control. In reverse, party B can receive message keys, via the proxy or otherwise but not share them with party C. Thus, party C can limit party B's access by denying access to message data, and party B can limit party C's access by denying decryption of the message key. This partial involvement of an intermediary for data (C) and encryption (B) is in contrast to the peer-to-peer approach of OpenPGP™ style systems.

FIG. 1 shows a system block diagram for performing delegated end to end encryption, according to an embodiment. FIG. 1 includes one or more delegate compute device(s) 120, one or more camera(s) 140, and one or more user compute device(s) 160, each communicatively coupled to one another via network 180.

Network 180 can be any suitable communications network for transferring data, for example, operating over public and/or private communications networks. For example, network 180 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 180 can be a wireless network such as, for example, a Wi-Fi® or wireless local area network ("WLAN"), a wireless wide area network ("WWAN"), and/or a cellular network. In other instances, the network 180 can be a wired network such as, for example, an Ethernet network, a digital subscription line ("DSL") network, a broadband network, and/or a fiber-optic network. In some instances, network 180 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via network 180 can be encrypted or unencrypted. In some instances, the network 180 can include multiple networks or subnetworks operatively coupled to one another by, for example, network bridges, routers, switches, gateways and/or the like.

Delegate compute device(s) 120 includes a processor 122 communicatively coupled to a memory 124 (e.g., via a system bus). The memory 124 can store camera key 150B encrypted by org master key 160A and, optionally, one or more transcoders 128 implemented in software, firmware and/or hardware. Camera(s) 140 can include a processor 142 communicatively coupled to a memory 144 (e.g., via a system bus). User compute device(s) 160 can include a processor 162 communicatively coupled to a memory 164 (e.g., via a system bus). User compute device(s) 160 and delegate compute device(s) 120 can each be any type of compute device, such as a server, desktop, laptop, tablet, mobile device, and/or the like.

Processor 122, 142, and/or 162 each can be, for example, a hardware-based integrated circuit (IC) or any other suitable processing device configured to run and/or execute a set of instructions or code. For example, processor 122, 142, and/or 162 each can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 122, 142, and/or 162 can be configured to run any of the methods and/or portions of methods discussed herein.

Memory 124, 144, and/or 164 each can be, for example, a random-access memory (RAM), a memory buffer, a hard drive, a read-only memory (ROM), an erasable programmable read-only memory (EPROM), and/or the like. Memory 124, 144, and/or 164 can be configured to store any data used by processor 122, 142, and/or 162, respectively, to perform the techniques (methods, processes, etc.) discussed herein. In some instances, memory 124, 144, and/or 164 can store, for example, one or more software programs and/or code that can include instructions to cause processor 122, 142, and/or 162, respectively, to perform one or more processes, functions, and/or the like. In some implementations, memory 124, 144, and/or 164 can include extendible storage units that can be added and used incrementally. In some implementations, memory 124, 144, and/or 164 each can be a portable memory (for example, a flash drive, a portable hard disk, a SD card, and/or the like) that can be operatively coupled to processor 122, 142, and/or 162, respectively. In some instances, memory 124, 144, and/or 164 can be remotely operatively coupled with a compute device (not shown in FIG. 1). In some instances, memory 124, 144, and/or 164 is a virtual storage drive (e.g., RAMDisk), which can improve I/O speed and in turn, accelerate image reading and writing.

Camera(s) 140 can be any type of camera, such as a dome camera, bullet camera, fisheye camera, internet protocol (IP) camera, 4K camera, pan-tilt-zoom (PTZ) camera, Wi-Fi camera, license plate recognition (LPR) camera, and/or the like. Camera(s) 140 can include a processor 142 communicatively coupled to a memory 144 (e.g., via a system bus).

Memory 144 can include (e.g., store) a representation of video 146 encrypted by media key 148A. Camera(s) 140 can capture/record the representation of video 146, and the representation of the video 146 can then be encrypted (e.g., by camera(s) 140) using media key 148A. Video 146 can have a first video format. Examples of video formats include MP4, MOV, AVI, WMV, AVCHD, WebM, FLV, and/or the like.

User compute device(s) 160 can receive a request to open and/or display video 146. For example, a user associated with (e.g., that owns, that is using, that has access to, etc.) user compute device(s) 160 can provide an input at the user compute device(s) 160 indicating a request to view the video 146. User compute device(s) 160, however, is not able to play/capable of playing the video 146. For example, user computer device(s) 160 might be able to play videos having a second video format that is different from the first video format, but not be able to play videos having the first video format. Additionally, user compute device(s) 160 and/or camera(s) 140 can be unable to convert video 146 from the first video format to the second video format.

Delegate compute device(s) 120 can be configured to convert a video having a first video format (e.g., video 146) to a video having a second video format (e.g., reformatted video 126), e.g., using transcoder 128. Giving delegate compute device(s) 120 a key (media key 148B) that is able to decrypt video 146 encrypted by media key 148A and access video 146, however, can be undesirable if, for example, delegate compute device(s) 120 can use media key 148B to then decrypt other videos captured (and encrypted using media key 148A) by camera(s) 140 and/or other cameras. The dilemma, then, is that (1) video 146 is in a video format that user compute device(s) 160 cannot open and/or play, (2) camera(s) 140 and/or user compute device(s) 160 cannot convert video 146's format into a video format that user compute device(s) 160 can open and/or play, and (3) delegate compute device(s) 120 can convert video 146 into a video format that user compute device(s) 160 can open and/or play but providing delegate compute device(s) 120 a key that is able to decrypt video 146 could lead to delegate compute device(s) 120 using that key to then decrypt other data that is not desired to be decryptable by delegate compute device(s) 120; in such a case, delegated end-to-end encryption as described herein, in accordance with one or more embodiments, can be performed.

Delegated End-to-End Encryption

Memory 164 of user compute device(s) 160 can store organization (org) master key 162B. Org master key 162B can be, for example, a private key or symmetric key. Org master key 162B can be associated with an organization and be used as a master key to decrypt data associated with (e.g., created by users/user devices that are part of) the organization (but not other organizations). Additional details related to organization master keys are discussed in U.S. patent application Ser. No. 18/518,343, filed Nov. 22, 2023, and titled "SYSTEMS AND METHODS TO PERFORM END TO END ENCRYPTION" (the '343 application) the contents of which are incorporated by reference in its entirety herein.

Memory 124 of delegate compute device(s) 120 can include camera key 150B encrypted by org master key 162A. Camera key 150B can be, for example, a private key or symmetric key associated with (e.g., generated by, generated for use with, used to encrypt media keys that encrypt video captured by, etc.) camera(s) 140 (and not other cameras). Additional details related to camera keys are discussed in the '343 application, incorporated by reference herein.

Org master key 162A can be, for example, a public key or symmetric key; org master key 162A and org master key 162B can be a keypair (e.g., org master key 162A can encrypt data and org master key 162B can decrypt the data encrypted by org master key 162A). Camera key 150B encrypted by org master key 162A can be sent from delegate compute device(s) 120 to user compute device(s) 160. In response, user compute device(s) 160 can decrypt camera key 150B encrypted by org master key 162A using org master key 162B to obtain camera key 150B. In response, user compute device(s) 160 can send camera key 150B to delegate compute device(s) 120.

Memory 144 of camera(s) 140 can store (1) video 146 encrypted by media key 148A and (2) media key 148B encrypted by camera key 150A. Media key 148A can be, for example, a public key or symmetric key. Media key 148B can be, for example, a private key or symmetric key. Media key 148A and media key 148B can be a keypair (e.g., media key 148A can encrypt data and media key 148B can decrypt the data encrypted by media key 148A). Camera key 150A can be, for example, a public key or symmetric key. Camera key 150A and camera key 150B can be a keypair (e.g., camera key 150A can encrypt data and camera key 150B can decrypt the data encrypted by camera key 150A). Additional details related to media keys are discussed in the '343 application, incorporated by reference herein.

Camera(s) 140 can send (1) video 146 encrypted by media key 148A and (2) media key 148B encrypted by camera key 150A to delegate compute device(s) 120 (e.g., but not user compute device(s) 160) via network 180. Delegate compute device(s) 120 can use camera key 150B (received from user compute device(s) 160) to decrypt media key 148B encrypted by camera key 150A and obtain media key 148B. Delegate compute device(s) 120 can then use media key 148B to decrypt video 146 encrypted by media key 148A and obtain video 146. Delegate compute device(s) 120 can then perform any type of data augmentation/analysis technique (e.g., reformatting using transcoder 128, obfuscating an identifier like a face, license plate, or driver's license, etc.) on video 146 to generate reformatted video 126. Reformatted video 126 can then be sent to user compute device(s) 160. User compute device(s) 160 can then output (e.g., display) reformatted video 126.

In some implementations, media key 148A is generated (e.g., using a cryptographically secure pseudorandom number generator (PRNG)) concurrently with (or overlapping in time with)/in response to (e.g., automatically and without human intervention) generating video 146. Video 146 can represent an entire video or a portion of the entire video (e.g., one frame, ten minute portion of the entire video, etc.) captured by camera(s) 140, and media key 148A can be generated automatically (e.g., without human intervention) in response to capturing/generating/saving video 146.

In some implementations, user compute device(s) 160 receives reformatted video 126 but does not receive video 146 or video 146 encrypted by media key 148A.

In some implementations, camera key (e.g., camera keys 150A and/or 150B) can be stored (e.g., not be deleted) for a long time (e.g., not restricted to time/duration). The camera keys might rotate ("change") relatively infrequently—for example, once a year or never rotate. The media keys (e.g., media key 148A and/or 148B), in contrast, can rotate more frequently. The frequency of rotation of the camera keys and/or the media keys can be customizable. The media key can be specific to, for example, one frame of video, one minute of video, or to a predefined specific duration of footage (e.g., a duration of 20 minutes), which can correspond to a sub-video, discussed below. In effect, user compute device(s) 160 is given the ability to delegate a particular portion of the decryption to delegate compute device(s) 120.

In some implementations, media keys 148A and 148B are unique to video 146; said differently, media keys 148A and 148B only encrypt/decrypt video 146 and not other videos. If video 146 is part of a longer, composite video, those other parts of the composite video can be encrypted using a media key different than media key 148A, and decrypted using a media key different than media key 148B. In one example, a user requests, via user compute device(s) 160, a full length video captured by camera(s) 140. At the backend (e.g., delegate compute device(s) 120), the full length video might have been divided into sub-videos. Each sub-video can be associated with (e.g., encrypt able and/or decryptable using) its own media keys. When user compute device(s) 160 requests the full length video, the user compute device(s) 160 is configured to recognize in advance and/or at that time that it won't be able to play the full length video (compatibility aware). At first, user compute device(s) 160 makes the request just for the keys (e.g., the media keys associated with the sub-videos, where each private/symmetric media key is encrypted using camera key 150A). Then, user compute device(s) 160 makes a second request for the sub-videos, and as part of that same step, offers the decrypted media keys to delegate compute device(s) 120 (e.g., at a media proxy). Each unwrapped key (e.g., media key 148B), however, only decrypts the sub-video associated with that unwrapped key. The encrypted sub-videos can be stored on delegate compute device(s) 120 for purposes of transcoding and/or combining to generate a transcoded-version of the full length video. Alternatively or in addition, the encrypted sub-videos can be stored in remote/cloud storage (e.g., a compute device not shown in FIG. 1) for purposes of transcoding and/or combining to generate a transcoded-version of the full length video. In some implementations, user compute device(s) 160 does not receive the un-transcoded video (e.g., video 146) itself, for example because that would be wasteful/undesirably computationally expensive.

Media Keys

As discussed, delegated end-to-end encryption can include generating and using media key 148B (sometimes referred to herein as a "subkey") in response to capturing video 146 and/or user compute device(s) 160 requesting and/or attempting (then failing) to open video 146. Media key 148B is a key that is able to decrypt video 146 encrypted by media key 148A to obtain video 146. For example, media key 148A and media key 148B can be a key pair, and video 146 is encrypted by media key 148A. Delegate compute device(s) 120 can decrypt video 146 encrypted by media key 148A using media key 148B to obtain video 146, and delegate compute device(s) 120 can reformat video 146 to generate reformatted video 126. Reformatted video 126 has the second video format, and can be sent to user compute device(s) 160 (e.g., to play the reformatted video 126). In some implementations, reformatted video 126 is encrypted when being sent to user compute device(s) 160. In some implementations, reformatted video 126 is not encrypted using media key 148A, org master key 162A, or camera key 150A when being sent to user compute device(s) 160. In some implementations, media key 148B is generated on camera(s) 140.

Although delegate compute device(s) 120 can decrypt video 146 encrypted by media key 148A using media key 148B to gain access to video 146, the access to video 146, access to other data, and/or access to/ability to use the media key 148B can be limited. For example, for each media key, there is a time-to-live value on that media key when that media key is stored in a database, and the database can repeatedly (e.g., periodically, sporadically, continuously, etc.) delete media keys that have expired values. Media key 148B can be used to grant or confer limited permissions. In some implementations, media key 148B can only be generated and/or used for decrypting video 146 encrypted by media key 148A and not, for example, other videos such as other encrypted videos (e.g., captured by camera(s) 140 and/or a different camera). Said differently, for a given set of multiple videos, each video/encrypted video from the set of multiple videos can be associated with (e.g., decryptable using) a unique/different media key from a set of multiple media keys. Thus, if camera(s) 140 captured a second video different from video 146 and encrypted that second video, media key 148B could not be used to decrypt that encrypted second video. Thus, even if video 146 is part of a longer, composite video (e.g., video 146 only represents one frame of the longer video, video 146 represents only 20 minutes of the longer video, etc.), media key 148B can be used to obtain video 146 but not other, unencrypted parts of the longer video; to obtain unencrypted versions of the other parts of the longer video, a similar process of key exchanging and encryption/decryption as discussed herein can be applied using a different media key unique to/able to decrypt (e.g., at delegate compute device(s) 120 and/or a different delegate compute device) those other parts of the longer video. Said differently, the other parts of the longer video are not encrypted using media key 148A. The other parts of the longer video can instead be, for example, each encrypted using a different media key (e.g., one part is encrypted using a first media key, a second part is encrypting using a second media key, etc.). If video 146 and the other parts of the longer video were all captured by camera(s) 140, even though those videos are each encrypted using a different media key, those different media keys can each be encrypted using camera key 150A. Video 146 and each of the other parts of the longer video can be of the same duration (e.g., each 1 frame worth of video, each 20 minutes' worth of video, etc.) and/or of different durations.

In some implementations, media key 148B is only generated and/or used for a predefined type of content. Said differently, media key 148A is only used to encrypt the predefined type of content. For example, media key 148B can be used to decrypt videos (e.g., videos encrypted using media key 148A), but not non-videos (e.g., error logs, audit logs, etc.), which have not been encrypted using media key 148A. As another example, media key 148B can be used to decrypt a first type of sensor data (e.g., videos), which have been encrypted by media key 148A, but not a second type of sensor data different than the first type of sensor data (e.g., temperature) that has not been encrypted using media key 148A.

In some implementations, media key 148B is only generated and/or used for a predefined period of time. For example, media key 148B can only be used within a predefined period of time (e.g., one second, 30 seconds, one minute, five minutes, one hour, one day, etc.) from creation of media key 148B and/or video 146, from a user associated with user compute device(s) 160 requesting to view video 146, from delegate compute device(s) 120 receiving media key 148B, and/or the like.

In some implementations, media key 148B is only generated and/or used by a predefined set of users. For example, if a user associated with user compute device(s) 160 logged into a user account at user compute device(s) 160 to request video 146, media key 148B is only generated and/or used for that user account. If, however, a different user requests video 146 (e.g., using a different user account and not included in the predefined set of users), media key 148B is not generated, not provided to delegate compute device(s) 120, and/or not used to decrypt video 146 encrypted using media key 148A.

In some implementations, media key 148B is only generated and/or used by a predefined set of devices. For example, media key 148B is only generated, provided to delegate compute device(s) 120, and/or used to decrypt video 146 encrypted by media key 148A if video 146 is requested by user compute device(s) 160 and not a different compute device (e.g., a compute device not shown in FIG. 1 and not included in the predefined set of devices). As another example, media key 148B is only generated, provided to/obtained by delegate compute device(s) 120, and/or used to decrypt video 146 encrypted by media key 148A if video 146 is requested by a set of compute devices associated with (e.g., owned by, in the name of, provided by, used by employees and affiliates of, etc.) an organization and not other compute devices.

In some implementations, media key 148B is destroyed/deleted/revoked/expired after a predefined trigger. For example, media key 148B can be destroyed in response to a predefined period of time passing (e.g., since media key 148B encrypted by camera key 150A was issued to delegate compute device(s) 120, since media key 148B was used to decrypt video 146 encrypted by media key 148A, since media key 148B was generated, since reformatted video 126 is received at user compute device(s) 160, and/or the like). As another example, media key 148B can be destroyed in response to a predefined action occurring, such as in response to using media key 148B to decrypt video 146 encrypted by media key 148A, in response to using media key 148B to reformat video 146 to reformatted video 126, in response to using media key 148B to send reformatted video 126 to user compute device(s) 160, in response to delegate compute device(s) 120 trying to save media key 148B in memory, in response to delegate compute device(s) 120 trying to create a copy of media key 148B, in response to delegate compute device(s) 120 trying to send media key 148B to a different compute device, and/or the like.

By limiting media key 148B and/or destroying media key 148B after a predefined trigger, delegate compute device(s) 120 has more limited access to videos and/or other data. For example, in some implementations, although delegate compute device(s) 120 can decrypt video 146 encrypted by media key 148A using media key 148B, delegate compute device(s) 120 can't use media key 148B to decrypt other videos (e.g., if those other videos are not encrypted using media key 148A). As another example, in some implementations, although delegate compute device(s) 120 can decrypt video 146 encrypted by media key 148A and other videos requested by a predefined set of user accounts using media key 148B, delegate compute device(s) 120 can't use media key 148B to decrypt videos requested by other user accounts outside the predefined set of user accounts. Issuing and maintaining media keys on an as-needed basis, rather than using a master key capable of decrypting a larger set of data, limits delegate compute device(s) 120's access to data that is otherwise preferred to be kept confidential.

Memory 124 can also include (e.g., store) one or more transcoders 128, which can be used for one or more techniques described herein. For example, transcoder 128 can convert videos files and package them for better delivery to, for example, web, mobile, and connected TVs. Transcoder 128 can perform digital-to-digital conversion of one encoding to another.

In some implementations, user compute device(s) 160 requests video 146 at a browser of user compute device(s) 160. For example, user compute device(s) 160 navigates to a website of an organization (e.g., that owns and/or manages delegate compute device(s) 120 and/or camera(s) 140), logs into a user account, and requests video 146 at the website. Because the browser cannot play video 146, however, one or more delegate compute device(s) 120 can generate reformatted video 126. In response to receiving reformatted video 126, user compute device(s) 160 may then play the reformatted video 126 at the browser.

In some implementations, video 146 is part of a longer, composite video that includes video captured by multiple cameras. For example, video 146 can be part of a composite video that includes a different video, where video 146 is captured by camera(s) 140 and the different video is captured by a camera different than camera(s) 140. Additionally or alternatively, in some implementations, the longer, composite video includes video 146 captured by camera(s) 140 at a first video quality (e.g., 1080p) and a different video captured by camera(s) 140 and/or a camera not shown in FIG. 1, at a second video quality (e.g., 720p) different than the first video quality.

Although FIG. 1 is discussed herein in the context of user compute device 160 not being able to play or generate a certain video format, in other implementations, user compute device 160 is not configured to perform some other action that delegate compute device 120 is configured to perform. For example, user compute device 160 is configured to not obfuscate (e.g., blur, hide, cover) identifiers (e.g., faces, license plates, etc.) in a video, but can delegate such task(s) to delegate compute device 120 (which is configured to obfuscate identifiers). As another example, user compute device 160 can be configured to not add graphical markings or text to highlight activity-such as bounding boxes around people or vehicles, arrows indicating movement or direction, paths showing trajectories, heatmaps overlaying areas of frequent activity, labels identifying individuals, time codes or event markers, status indicators, watermarks, and/or the like—at video 146, but can delegate such task(s) to delegate compute device 120 (which is configured to perform such tasks).

Although FIG. 1 shows camera(s) 140, in some implementations, a different sensor and/or compute device can store video 146, and the different sensor and/or compute device can include a server, desktop, laptop, tablet, mobile device, temperature sensor, proximity sensor, accelerometer, infrared sensor, pressure sensor, light sensor, ultrasonic sensor, smoke sensor, gas sensor, alcohol sensor, touch sensor, color sensor, humidity sensor, position sensor, magnetic sensor, microphone, tilt sensor, flow and level sensor, passive infrared sensor, touch sensor, strain and weight sensor, and/or the like.

Although FIG. 1 shows a media key keypair, camera key keypair, org master key keypair, video 146, reformatted video 126, and transcoder 128 in some implementations, any number of any type of keypairs, videos, reformatted videos, and/or transcoders can be generated and used. For example, if camera(s) 140 captures X videos (X being any positive integer), X encrypted videos, X media key keypairs, and X reformatted videos can be generated. As another example, if camera(s) 140 captures a single video and X encrypted videos are generated by breaking the single video into X sub-portions, the X sub-portions can each be encrypted using a different media key and decryptable using a different media key.

Although FIG. 1 shows a single camera(s) 140 and single user computer device(s) 160, in some implementations, any number of cameras and/or user compute devices can be used. For example, user compute device(s) 160 can request video from camera(s) 140 and an additional camera not shown in FIG. 1. As another example, user compute device(s) 160 and an additional user compute device not shown in FIG. 1 can request video 146. As another example, delegate compute device(s) 120 can generate reformatted videos using videos captured by multiple cameras. Each of those cameras can be associated with a unique/different camera key (e.g., camera(s) 140 is associated with camera keys 150A and 150B, a different camera not shown in FIG. 1 is associated with camera keys different than camera keys 150A and 150B, etc.).

Although FIG. 1 shows delegate compute device(s) 120 as a single device, in some implementations, more than one compute device can be used to perform the functionalities of delegate compute device(s) 120. For example, a first compute device (e.g., and not a second or third compute device) can store and send camera key 150B encrypted by org master key 162A to user compute device(s) 160, the second compute device (e.g., and not the first or third compute device) can receive camera key 150A from user compute device(s) 160 and decrypt media key 148B encrypted by camera key 150A to obtain media key 148B, and the third compute device (e.g., and not the first or second compute device) can receive media key 148B from the second compute device, decrypt video 146 encrypted by media key 148A using media key 148B to obtain video 146, generate reformatted video 126 based on video 146 and using transcoder 128, and send reformatted video 126 to user compute device(s) 160.

In some implementations, instead of or in addition to reformatting video 146 to generate reformatted video 126, video 146 can be augmented. Thus, delegate compute device(s) 120 can perform an augmentation of video 146 (e.g., that camera(s) 140 and/or user compute device(s) 160 is not configured to perform). Examples of augmentations include blurring identifier (e.g., faces, license plates, driver licenses, etc.), adding bounding boxes, labelling objects, and/or the like.

In some implementations, delegate compute device(s) 120 can perform archiving. Archiving can refer to creating a downloadable file (e.g., of video 146 and/or reformatted video 126). Archiving does not change a format of data. Archiving can be performed asynchronously, and can include adding a watermark that includes data about video 146 and/or reformatted video 126.

Additional details related to how data, such as video 146, can be encrypted/decrypted, and related to how keys can be exchanged to perform end to end encryption can be found in the '343 application, incorporated by reference herein.

Figure 2:
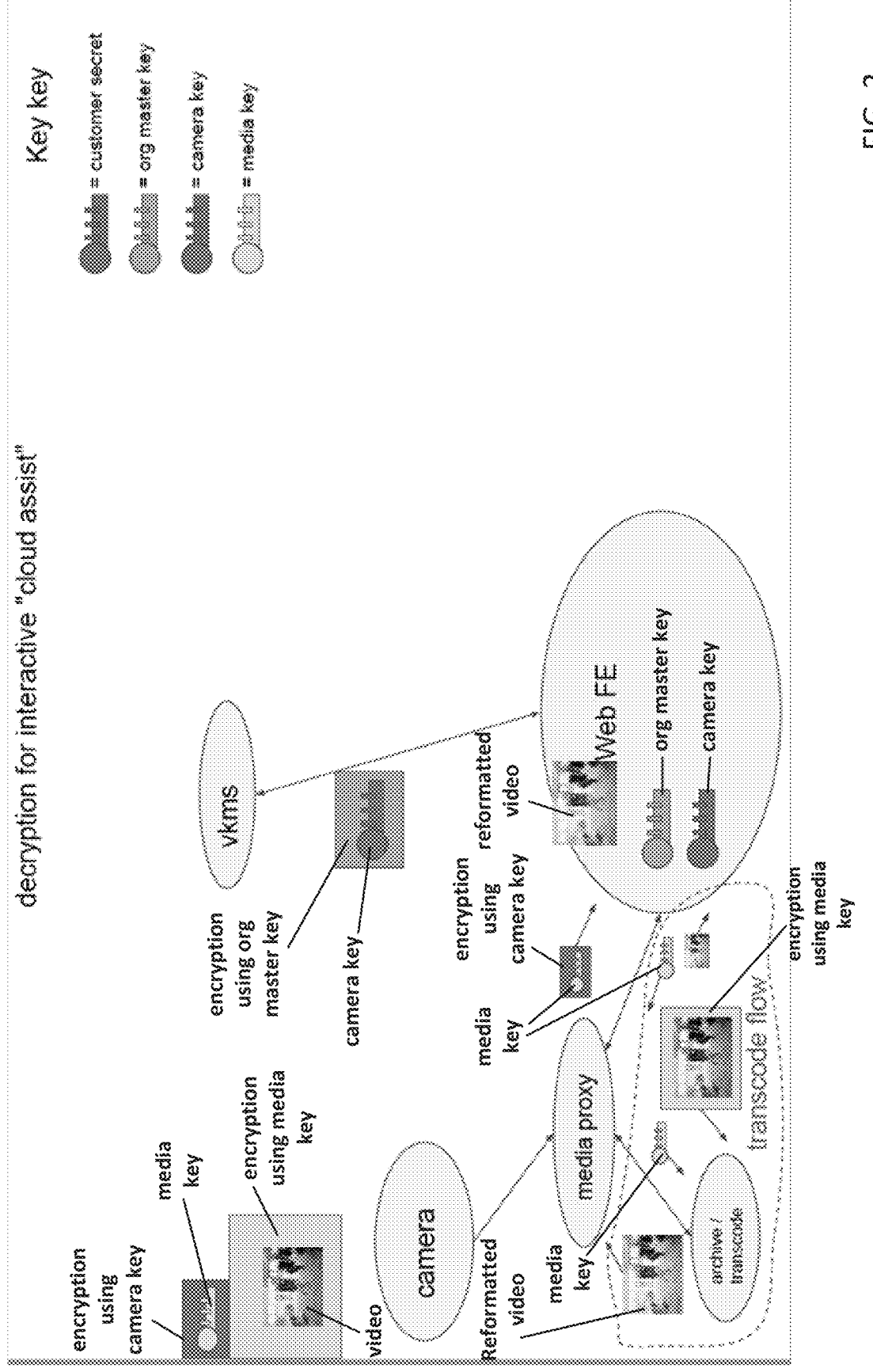
FIG. 2 illustrates a process to transcode video, according to an embodiment.

FIG. 2 illustrates a process to transcode video, according to an embodiment. FIG. 2 includes a representation of a camera, media proxy, web FE, vkms, and archive/transcode. Archive/transcode can be, for example, a compute device configured to perform archiving/transcoding. In an example with reference to FIG. 1, the camera could be camera(s) 140, web FE could be user compute device(s) 160, and the media proxy, vkms, and archive/transcode could be delegate compute device(s) 120. In some implementations, media proxy, vkms, and archive/transcode are each separate compute devices (e.g., each communicatively coupled via network 180). In some implementations, the media proxy, vkms, and archive/transcode may collectively be referred to as a "backend" relative to the web FE.

Web FE can include an org master key (e.g., org master key 162B). Web FE can receive the camera key (e.g., camera key 150B) encrypted by the org master key (e.g., org master key 162A) from vkms, and decrypt the camera key encrypted by the org master key using the org master key to obtain the camera key (e.g., camera key 150B). Web FE can receive, via the media proxy and/or from the camera, a media key (e.g., media key 148B) encrypted by the camera key (e.g., camera key 150A), and decrypt the media key encrypted by the camera key using the camera key to obtain the media key (e.g., media key 148B). The compute device configured to perform archiving/transcoding can receive sensor data (e.g., video 146) encrypted by the media key (e.g., media key 148A) from the camera and/or via the media proxy, and the media key (e.g., media key 148B) from web FE. Thereafter, the compute device configured to perform archiving/transcoding can decrypt the sensor data (e.g., video 146) encrypted by the media key (e.g., media key 148A) using the media key (e.g., media key 148B) to obtain the sensor data (e.g., video 146). The sensor data can then be used for archiving/transcoding to generate reformatted sensor data (e.g., reformatted video 126), and the reformatted sensor data can be sent to web FE (e.g., via the media proxy).

FIG. 3 illustrates a process to decrypt for background processing, according to an embodiment. FIG. 3 illustrates a camera, storage (e.g., persistent storage), and system. The camera includes sensor data (e.g., video 146) encrypted using a media key (e.g., media key 148A), a media key (e.g., media key 148B) encrypted using a camera key (e.g., camera key 150A), and a media key (e.g., media key 148B) encrypted using a recipient key. Storage can receive the sensor data (e.g., video 146) encrypted using a media key (e.g., media key 148A), a media key (e.g., media key 148B) encrypted using a camera key (e.g., camera key 150A), and a media key (e.g., media key 148B) encrypted using a recipient key from the camera (or via an intermediate device such as a media proxy). In some implementations, storage (e.g., persistent storage) is used to make the processing queued/asynchronous and handle outages and/or bursts; in some implementations, however, storage is not used. In some implementations, when using persistent storage, the version of the media key encrypted by the agent's recipient key is not stored. This way, if the agent recipient key is ever exposed, previously persisted data is not at risk because the actual media key obtainable with it is long gone. System can include, for example, a computer vision (CV) or AI processor. The system can include a secure memory, secure CPU, memory, and CPU (e.g., as discussed with respect to FIGS. 10-12). The secure memory can store a recipient key that can be used based on rules/if certain conditions are met. If the rules/conditions are met, the system can decrypt the media key encrypted by the recipient key using the recipient key stored in the secure memory of the system to obtain the media key. The media key can then be used to decrypt the sensor data encrypted using the media key to obtain an unencrypted version of the sensor data. Additional details related to FIG. 3 are discussed with respect to FIGS. 9-11.

FIG. 4 illustrates a process to transcode a video, according to an embodiment. A command web (e.g., user compute device(s) 160 can include (e.g., store) an org master key and camera key. The command web can receive (1) camera key encrypted by org master key and (2) media key encrypted by camera key. The command web can use the org master key to decrypt the camera key encrypted by the org master key to obtain the camera key, and use the camera key to decrypt the media key encrypted by the camera key to obtain the media key. The command web can then send the media key to vkms. Vkms can the send the media key to vhistory/vmedia. Vhistory/vmedia (and/or vtranscode) can then receive a video encrypted by the media key and decrypt the video encrypted by the media key using the media key to obtain the video. Vtranscode can then transcode the video so that the command web receives the transcoded video. Vkms, vhistory/vmedia, and/or vtranscode can be part of any compute devices; for example, in some implementations, vkms, vhistory/vmedia, and/or vtranscode are part of delegate compute device(s) 120.

Figure 5:
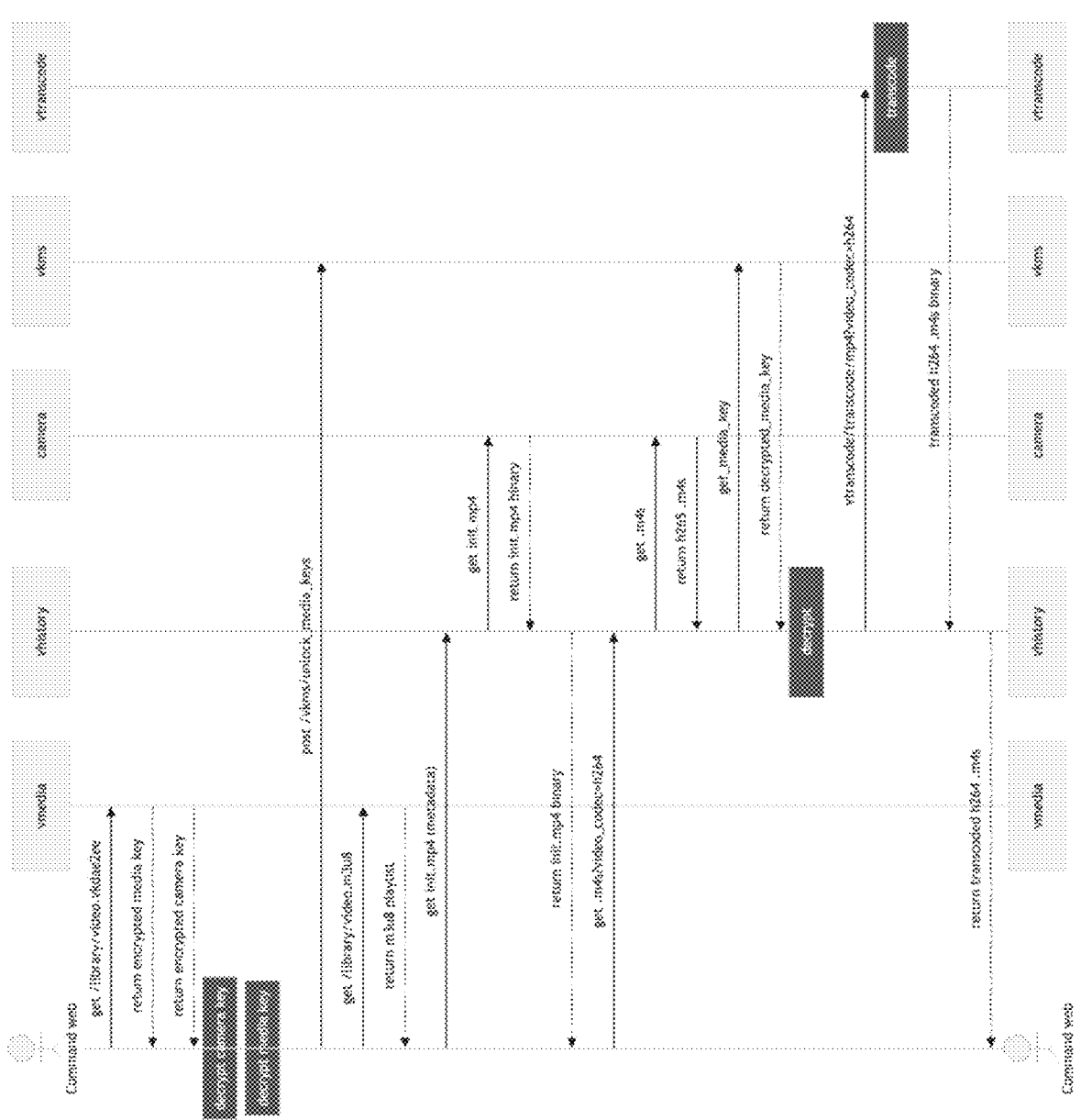
FIG. 5 illustrates a dataflow for transcoding, according to an embodiment.

FIG. 5 illustrates a dataflow for transcoding (e.g., using a desktop like Firefox®), according to an embodiment. As illustrated, in some implementations command web sends a "get /library/video.vkdae2ee" command to vmedia. Vmedia returns an encrypted media key and encrypted camera key to command web. Command web (e.g., user compute device(s) 160) decrypts the camera key and decrypts the media key. Command web sends a "post /vkms/submit_unlocked_media_keys" command to vkms. Command web sends a "get /library/video.m3u8" command to vmedia. Vmedia sends a "return m3u8 playlist" command to command web. Command web sends a "get init.mp4 (metadata)" command to vhistory. Vhistory sends a "get init.mp4" command to camera (e.g., camera(s) 140) and camera sends a "return init.mp4 binary" command to vhistory. Vhistory sends a "return init.mp4 binary" command to command web. Command web sends a "get.m4s?video_codec=h264" command to vhistory. Vhistory sends a "get_m4s" command to camera. Camera sends a "return h265.m4s" command to vhistory. Vhistory sends a "get_media_key" command to vkms. Vkms sends a "return decrypted_media_key" command to vhistory and vhistory decrypts "decrypted_media_key." Vhistory sends a "vtranscode/transcode/mp4?video_codec=h264" command to vtranscode. Vtranscode performs transcoding and sends a "transcoded h264.m4s binary" command to vhistory. In some implementations, an example of delegate compute device(s) 120 is vmedia, vhistory, vkms, and/or vtranscode. Vhistory sends a "return transcoded h264.m4s" command to command web.

Figure 6:
FIG. 6 shows a flowchart of a method to generate and use a subkey, according to an embodiment.

FIG. 6 shows a flowchart of a method 700 to generate and use a subkey, according to an embodiment. In some implementations, method 700 is performed by a processor(s) (e.g., processor 122, 142, and/or 162). At 702, an encrypted video (e.g., video 146 encrypted using media key 148A) is generated (e.g., by camera(s) 140). In some implementations, a video (e.g., video 146) is encrypted using a subkey (e.g., media key 148A) to generate the encrypted video. At 704, the encrypted video is requested (e.g., by user compute device(s) 160). For example, as shown in FIG. 1, user compute device(s) 160 can request (e.g., via a browser) to receive and/or play the video. At 706, a subkey (e.g., media key 148B) is generated. In some implementations, 706 occurs automatically (e.g., without human intervention) in response to 704. At 708, the encrypted video is decrypted using the subkey and converted into a reformatted video (e.g., reformatted video 126), e.g., by a compute device different from the user compute device(s) 160, such as camera(s) 140 and/or delegate compute device(s) 120. The reformatted video can then be sent to the requestor's compute device.

FIG. 7 shows a flowchart of a method 800 for a delegated compute device to use a subkey, according to an embodiment. In some implementations, method 800 is performed by a processor (e.g., processor 122).

At 802, a subkey (e.g., media key 148B) is received at a first compute device (e.g., delegate compute device(s) 120) and from a second compute device (e.g., user compute device(s) 160). The subkey is received in response to the second compute device requesting a video (e.g., video 146). The video has a first format, the second compute device is configured to play videos having a second format, and the second compute device is not configured to play videos having the first format. The second compute device is configured to decrypt an encrypted version of the subkey to obtain the subkey. The first compute device is not configured to decrypt the encrypted version of the subkey. In some implementations, subkey can be generated at the time video 146 is generated/captured at camera(s) 140; said differently, the subkey is generated concurrently with (or overlapping in time with) the video (e.g., when the video is captured, when the video begins being captured, during capturing the video, etc.). In some implementations, the subkey is encrypted using a camera key (e.g., camera key 150A), and a decrypting version of the camera key (e.g., camera key 150B) is used to obtain the subkey. At 804, an encrypted video (e.g., video 146 encrypted using media key 148A) including an encrypted version of the video is received. At 806, the encrypted video is decrypted using the subkey to obtain the video. At 808, the video is reformatted to generate a reformatted video (e.g., 126) having the second format. At 810, the reformatted video is sent to the second compute device. In some implementations, the reformatted video sent to the second compute device at 810 is encrypted. At 812, the subkey is deleted in response to reformatting the video at 808 to generate the reformatted video. During method 800, the second compute device does not receive video 146 and/or video 146 encrypted using media key 148A.

In some implementations of method 800, the encrypted video is received from a camera (e.g., camera(s) 140). For example, the encrypted video can be received via a wireless connection or a wired connection.

In some implementations of method 800, the subkey is a first subkey and method 800 further includes sending, to the second compute device, a second key (e.g., camera key) encrypted by an encrypting version of a third key (e.g., org master key). The second compute device is configured to decrypt the second key encrypted by the encrypting version of the third key using a decrypting version of the third key stored at the second compute device to obtain the second key.

In some implementations of method 800, the subkey is a first subkey, the video is a portion of a composite video, and remaining portions of the composite video are associated with a second subkey different from the first subkey.

In some implementations of method 800, the subkey is a first subkey, the video is a first video, a composite video includes the first video and a second video, the encrypted video is a first encrypted video, the reformatted video is a first reformatted video, and method 800 further includes receiving, from the second compute device and in response to the second compute device requesting the second video, a second subkey generated concurrently with (or overlapping in time with) generating the second video that has the first format. The second compute device is configured to decrypt an encrypted version of the second subkey to obtain the second subkey. The first compute device is not configured to decrypt the encrypted version of the second subkey. Some implementations of method 800 further include receiving a second encrypted video including an encrypted version of the second video. The second encrypted video is encrypted using an encrypting version of the second subkey and not encrypted using an encrypting version of the first subkey. Some implementations of method 800 further include decrypting the second encrypted video using the second subkey and not using the first subkey to obtain the second video. Some implementations of method 800 further include reformatting the second video to generate a second reformatted video having the second format. Some implementations of method 800 further include sending the second reformatted video to the second compute device. Some implementations of method 800 further include deleting, via the processor, the second subkey in response to reformatting the second video to generate the second reformatted video.

In some implementations of method 800, the second compute device is configured to request the video (1) based on user input at a browser of the second compute device and (2) while the second compute device is logged into a user account.

Some implementations of method 800 further include refraining from sending the video to the second compute device.

Some implementations of method 800 further include refraining from sending the encrypted video to the second compute device.

Agent

Some implementations are related to using an agent within a system, where a recipient can delegate some authority to the agent in advance. The agent can include/use a secure memory and secure CPU, where a private recipient key (or symmetric key) is stored at the secure memory and accessible by the secure CPU. The recipient can specify rules/conditions for when the private recipient key can be accessed by the agent. When the agent does receive the recipient private key, the agent can perform certain tasks that would otherwise be performed by the recipient. For example, the agent can decrypt a media key encrypted by the recipient key using the recipient private key to obtain an unencrypted version of the media key (e.g., for sending to an assistant to decrypt sensor data encrypted by the media key).

Figure 9:
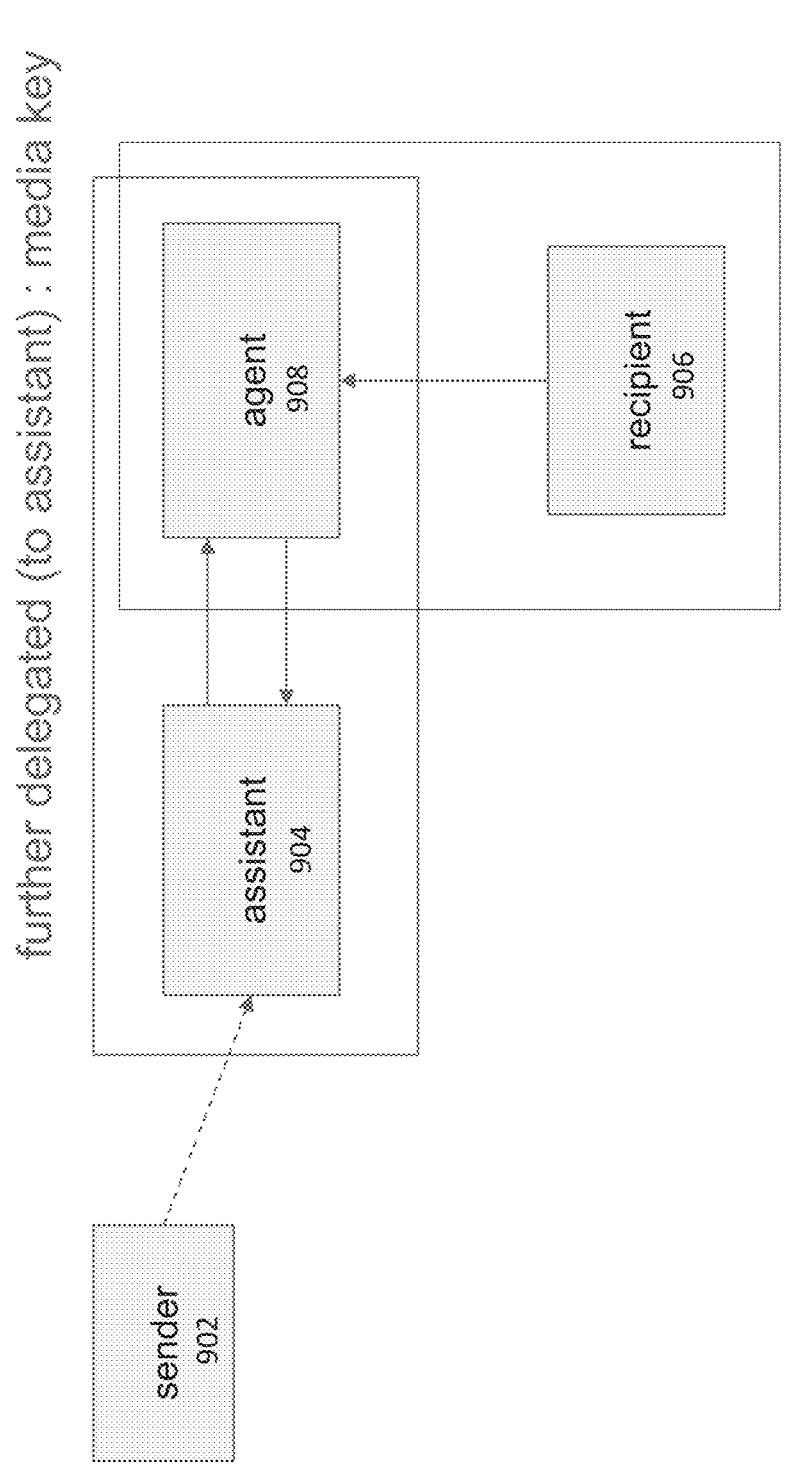
FIG. 9 illustrates a delegation system that includes an agent, according to an embodiment.

As illustrated in FIG. 8, some implementations are related to sender 902, assistant 904, and recipient 906 performing a key exchange that includes recipient 906 delegating a media key to assistant 904. Sender 902 can be, for example, camera(s) 140 from FIG. 1. Assistant 904 can be, for example, delegate compute device(s) 120 from FIG. 1. Recipient 906 can be, for example, user compute device(s) 160. For the situation described in FIG. 8, recipient 906 interacts with sender 902 and assistant 904 in a synchronous and time-coincident manner. Thus, in a situation where recipient 906 is not available (e.g., turned off, not online, functioning improperly, etc.), the key exchange represented by FIG. 8 may not execute properly. Thus, as illustrated in FIG. 9, some implementations are related to using agent 908. In some implementations, recipient 906 effectively delegates to agent 908 a private key (sometimes referred to herein as a "recipient private key), along with/based on rules about when to use the recipient private key and/or when the recipient private key can be delegated from recipient 906 to agent 908. Rules for agent 908 to use and/or receive the recipient private key can be, for example, (1) some attribute in the decrypted content (e.g., time-based, which might be absolute such as between Apr. 5, 2024 and Apr. 20, 2024), (2) relative to an attribute in the decrypted content (e.g., last 5 minutes), (3) relative to an attribute in the ciphertext (e.g., an environmental state not part of the content itself, for example sound pressure level (for explosion), ambient light (darkness), vibration (tampering, or earthquake, and/or the like)), (4) at some maximum rate (10 times per minute), (5) with respect to some quality of the decrypted content (e.g., person detection), and/or the like. Thus, unlike FIG. 8, assistant 904 and recipient 906 interact via agent 908 in FIG. 9. Said differently, unlike in FIG. 8, agent 908 acts as an intermediary between assistant 904 and recipient 906. As a result, even if recipient 906 is not available, key exchanging and media key delegation can occur; because the agent 908 has been delegated the recipient private key, agent 908 can perform operations with assistant 904 and/or sender 902 without recipient's 906 synchronous involvement.

In some implementations, recipient 906 and agent 908 are part of the same/a common system (e.g., customer-managed encryption keys, same compute device, user compute device(s) 160) or commonly owned (e.g., owned by a single entity and not, for example, owned separately by an organization and its client). In some implementations, agent 908 and assistant 904 are part of the same/a common system (e.g., delegate compute device(s) 120) or commonly owned. In some implementations, agent 908 is part of the same/a common system with one of assistant 904 or recipient 906 but not the other.

Some implementations are related to recipient's 906 ability to load rules to agent 908. By using agent 908, confidential computing (e.g., Intel SGX, AWS Nitro Enclave, ARM TrustZone, etc.) can be used. In some implementations, confidential computing refers to the software that is running on an agent (e.g., agent 908) and is not observable by the system in which it resides; except for inputs and outputs, the software of agent 908 is opaque and unobservable to the rest of the system housing agent 908.

Figure 10:
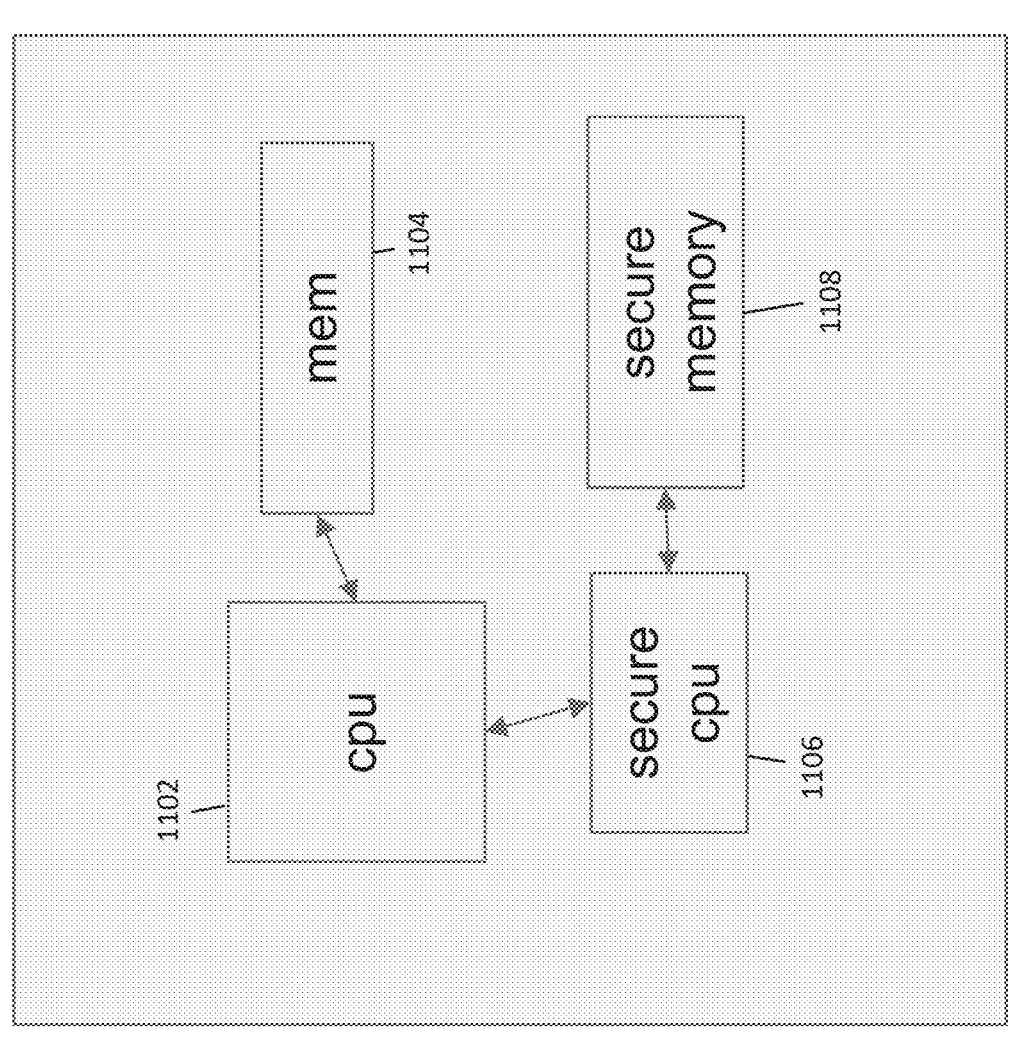
FIG. 10 illustrates a confidential computing system, according to an embodiment.

In some implementations, as illustrated in FIG. 10, a system (e.g., a compute device that stores agent 908) can include a CPU 1102, memory 1104, secure CPU 1106, and secure memory 1108. CPU 1102 and secure CPU 1106 are connected, but secure CPU 1102 will only run operations that are signed by a cryptographic key (e.g., secure CPU 1102 will only run signed instructions). Secure CPU 1106 can run the agent (e.g., agent 908). Secure CPU 1106 can prove that it only ran signed instructions. CPU 1102 can send input (e.g., some encrypted data) to secure CPU 1106 and secure CPU 1106 returns a function of the input to CPU 1102, but the function used is secret to CPU 1102 (e.g., could be decrypted using a key according to validated rules). Secure CPU 1106 can be operatively coupled to secure memory 1104, and secure memory 1104 can store a secret key (e.g., the recipient private key) that is known to secure CPU 1106 (e.g., but not known to CPU 1102 and/or memory 1104). In some implementations, where assistant 904 and agent 908 are part of the same system, the operator of the "assistant+agent" system is unable to access the contents of secure memory 1104. Thus, the operator is providing this trusted configuration without a customer of the operator (e.g., recipient 906) needing to manage it, and also without the operator actually having access to that secure recipient key (e.g., stored in secure memory 1104).

Figure 11:
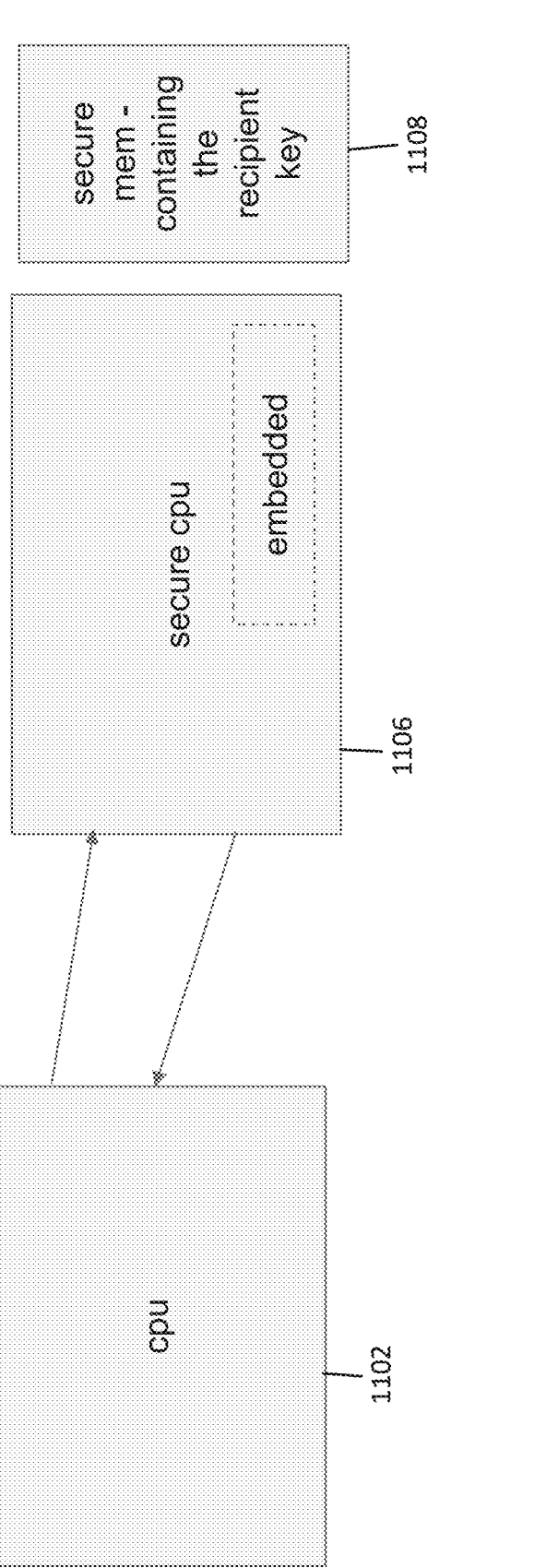
FIG. 11 illustrates a confidential computing system, according to an embodiment.

Recipient 906 can send a recipient private key to agent 908. The recipient private key can be encrypted so that only agent 908 can decrypt recipient private key; as illustrated in FIG. 11, secure memory 1108 can store the recipient private key. Sender 902 can send video that is encrypted using a media key (e.g., video 146 encrypted by media key 148A) to assistant 904 (e.g., AI processor/CV detector). Assistant can also have a media key encrypted by the recipient key, but not the recipient key to decrypt and obtain the media key 904. Said differently, assistant 904 cannot decrypt the encrypted video on its own and cannot decrypt the media key encrypted by the recipient key on its own. Instead, in some implementations, assistant 904 sends the \ media key encrypted by the recipient key to agent 908 which is running on secure CPU 1106. Secure CPU 1106 uses the recipient key and function to decrypt the media key encrypted by the recipient key using the recipient key according to the rules to obtain the media key (e.g., where the media key can then be sent to assistant 904 for transcoding and/or decrypting the encrypted video). In some implementations, recipient 906 can choose the rules and/or agent 908 can follow a default set of rules.

Recipient 906 can trust agent 908 to operate on its behalf. For example, a hardware provider can only unlock a secure memory if the secure CPU is running a program signed by a particular key. Similar to a hardware guarantee and audit, the program being run could be publicly available and known to the recipient (e.g., to perform an audit to check proper delivery). Audits generally come down to the signing, and various techniques can be applied for the auditing (e.g., paper audit ISO/SOC2, hardware security module that will self-destruct if tampered with and can provide an audit trail of every signature it has ever signed, blockchain that lists every program allowed to run so secure CPU loads only if on the blockchain, etc.). Recipient 906 can also trust that its recipient key is only going to the secure memory (e.g., and not some other intermediary). In view of typical asymmetric encryption, the secure CPU has a private key (e.g., the embedded key) that the recipient encrypts its recipient key to.

FIG. 12 shows a flowchart of a method 1200 for a delegated compute device to use a subkey, according to an embodiment. In some implementations, method 1200 is performed by a processor (e.g., processor 122).

At 1202, a first key (e.g., media key 148B) encrypted by an encrypting version of a second key (e.g., camera key 150A) is received from a first compute device (e.g., camera(s) 140) and in response to a second compute device (e.g., user compute device(s) 160) requesting a video (e.g., video 146). The first key is generated concurrently with (or overlapping in time with) generating the video that has a first format. The second compute device is configured to play videos having a second format and not configured to play videos having the first format. At 1204, the second key encrypted by an encrypting version of a third key (e.g., org master key 162A) is sent to the second compute device. At 1206, a decrypting version of the second key (e.g., camera key 150B) is received from the second compute device. The second compute device is configured to decrypt the second key encrypted by the encrypting version of the third key using a decrypting version of the third key (e.g., org master key 162B) to obtain the decrypting version of the second key. At 1208, the first key encrypted by the encrypting version of the second key is decrypted using the decrypting version of the second key to obtain a decrypting version of the first key (e.g., media key 148B). At 1210, the video encrypted by an encrypting version of the first key (e.g., media key 148A) is received from the first compute device. At 1212, the video encrypted by the encrypting version of first key is decrypted using the decrypting version of the first key to obtain the video. At 1214, the video is reformatted to generate a reformatted video (e.g., reformatted video 126) having the second format. At 1216, the reformatted video is sent to the second compute device. At 1218, the first key is deleted in response to reformatting the video to generate the reformatted video.

In some implementations of method 1200, the first key is generated at the first compute device. In some implementations of method 1200, the video includes video captured by the first compute device.

In some implementations of method 1200, the video is a first video, the first video is a portion of a composite video that includes a second video, the reformatted video is a first reformatted video, and method 1200 further includes receiving, from the first compute device and in response to the second compute device requesting the second video, a fourth key encrypted by the encrypting version of a second key. The fourth key is generated concurrently with (or overlapping in time with) generating the second video. The second video has the first format. Some implementations of method 1200 further include decrypting the fourth key encrypted by the encrypting version of the second key using the decrypting version of the second key to obtain a decrypting version of the fourth key. Some implementations of method 1200 further include receiving, from the first compute device, the second video encrypted by an encrypting version of the fourth key. Some implementations of method 1200 further include decrypting the second video encrypted by the encrypting version of fourth key using the decrypting version of the fourth key to obtain the second video. Some implementations of method 1200 further include reformatting the second video to generate a second reformatted video having the second format. Some implementations of method 1200 further include sending the second reformatted video to the second compute device. Some implementations of method 1200 further include deleting the fourth key in response to reformatting the second video to generate the second reformatted video.

FIG. 13 shows a flowchart of a method 1300 to generate a modified video, according to an embodiment. In some implementations, method 1300 is performed by a processor (e.g., processor 122).

At 1302, a subkey (e.g., media key 148B) is received at a first compute device (e.g., delegate compute device(s) 120), from a second compute device (e.g., user compute device(s) 160), and in response to the second compute device requesting a video (e.g., video 146). The video has a first format. The second compute device is configured to play videos having a second format and is not configured to play videos having the first format. The second compute device is configured to decrypt an encrypted version of the subkey (e.g., media key 148B encrypted using camera key 150A) to obtain the subkey. The first compute device is not configured to decrypt the encrypted version of the subkey. At 1304, an encrypted video (e.g., video 146 encrypted using media key 148A) including an encrypted version of the video is received. At 1306, the encrypted video is decrypted using the subkey to obtain the video. At 1308, the video is modified to generate a modified video (e.g., reformatted video 126) having the second format. Modifying the video to generate the modified video includes obfuscating an identifier.

Some implementations of method 1300 further include encrypting the modified video to generate an encrypted modified video. Some implementations of method 1300 further include sending the encrypted modified video to the second compute device.

Some implementations of method 1300 further include deleting the subkey in response to passage of a predefined period of time.

Some implementations of method 1300 further include receiving a request to save or copy the subkey. Some implementations of method 1300 further include deleting the subkey in response to receiving the request to save or copy the subkey.

In some implementations of method 1300, the identifier contains at least one of a face or a license plate.

In some implementations of method 1300, the video is a first video, the subkey is a first subkey, the encrypted video is a first encrypted video, the modified video is a first modified video, and method 1300 further includes receiving a second subkey at the first compute device, from the second compute device, and in response to the second compute device requesting a second video. The second video has the first format. The second compute device is configured to decrypt an encrypted version of the second subkey to obtain the second subkey. The first compute device is not configured to decrypt the encrypted version of the second subkey. Some implementations of method 1300 further include receiving a second encrypted video including an encrypted version of the second video. Some implementations of method 1300 further include decrypting the second encrypted video using the second subkey to obtain the second video. Some implementations of method 1300 further include modifying the second video to generate a second modified video having the second format.

In some implementations of method 1300, the subkey is generated in response to generating the video.

In some implementations of method 1300, the subkey is generated concurrently with (or overlapping in time with) generating the video.

In some implementations of method 1300, the video is a first video captured by a first camera, and the first video is a portion of a composite video that includes a second video captured by a second camera different than the first camera.

In some implementations of method 1300, the video is a first video having a first quality, and the first video is a portion of a composite video that includes a second video having a second quality different than the first quality.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A method, comprising:

receiving, via a processor of a first compute device, from a second compute device, and in response to the second compute device requesting a video, a subkey generated concurrently with generating the video that has a first format, the second compute device configured to play videos having a second format and not configured to play videos having the first format, the second compute device configured to decrypt an encrypted version of the subkey to obtain the subkey, the first compute device not configured to decrypt the encrypted version of the subkey;

receiving, via the processor, an encrypted video including an encrypted version of the video;

decrypting, via the processor, the encrypted video using the subkey to obtain the video;

reformatting the video, via the processor, to generate a reformatted video having the second format;

sending, via the processor, the reformatted video to the second compute device; and deleting, via the processor, the subkey in response to reformatting the video to generate the reformatted video.

2. The method of claim 1, wherein the encrypted video is received from a camera.

3. The method of claim 1, wherein the subkey is a first key, the method further comprising:

sending, via the processor and to the second compute device, a second key encrypted by an encrypting version of a third key, the second compute device configured to decrypt the second key encrypted by the encrypting version of the third key using a decrypting version of the third key stored at the second compute device to obtain the second key.

4. The method of claim 1, wherein the subkey is a first subkey, the video is a portion of a composite video, and remaining portions of the composite video are associated with a second subkey different from the first subkey.

5. The method of claim 1, wherein the subkey is a first subkey, the video is a first video, a composite video includes the first video and a second video, the encrypted video is a first encrypted video, the reformatted video is a first reformatted video, and the method further includes:

receiving, via the processor, from the second compute device, and in response to the second compute device requesting the second video, a second subkey generated concurrently with generating the second video that has the first format, the second compute device configured to decrypt an encrypted version of the second subkey to obtain the second subkey, the first compute device not configured to decrypt the encrypted version of the second subkey;

receiving, via the processor, a second encrypted video including an encrypted version of the second video, the second encrypted video encrypted using an encrypting version of the second subkey and not encrypted using an encrypting version of the first subkey;

decrypting, via the processor, the second encrypted video using the second subkey and not using the first subkey, to obtain the second video;

reformatting the second video, via the processor, to generate a second reformatted video having the second format;

sending, via the processor, the second reformatted video to the second compute device; and deleting, via the processor, the second subkey in response to reformatting the second video to generate the second reformatted video.

6. The method of claim 1, wherein the second compute device is configured to request the video (1) based on user input at a browser of the second compute device and (2) while the second compute device is logged into a user account.

7. The method of claim 1, further comprising:

refraining from sending the video to the second compute device.

8. The method of claim 1, further comprising:

refraining from sending the encrypted video to the second compute device.

9. An apparatus, comprising:

a memory; and a processor operatively coupled to the memory, the processor configured to:

receive, from a first compute device, and in response to a second compute device requesting a video, a first key encrypted by an encrypting version of a second key, the first key generated concurrently with generating the video that has a first format, the second compute device configured to play videos having a second format and not configured to play videos having the first format;

send, to the second compute device, the second key encrypted by an encrypting version of a third key;

receive, from the second compute device, a decrypting version of the second key, the second compute device configured to decrypt the second key encrypted by the encrypting version of the third key using a decrypting version of the third key to obtain the decrypting version of the second key;

decrypt the first key encrypted by the encrypting version of the second key using the decrypting version of the second key to obtain a decrypting version of the first key;

receive, from the first compute device, the video encrypted by an encrypting version of the first key;

decrypt the video encrypted by the encrypting version of first key using the decrypting version of the first key to obtain the video;

reformat the video to generate a reformatted video having the second format;

send the reformatted video to the second compute device; and delete the first key in response to reformatting the video to generate the reformatted video.

10. The apparatus of claim 9, wherein the first key is generated at the first compute device.

11. The apparatus of claim 9, wherein the video includes video captured by the first compute device.

12. The apparatus of claim 9, wherein the video is a first video, the first video is a portion of a composite video that includes a second video, the reformatted video is a first reformatted video, and the processor is further configured to:

receive, from the first compute device, and in response to the second compute device requesting the second video, a fourth key encrypted by the encrypting version of a second key, the fourth key generated concurrently with generating the second video, the second video having the first format;

decrypt the fourth key encrypted by the encrypting version of the second key using the decrypting version of the second key to obtain a decrypting version of the fourth key;

receive, from the first compute device, the second video encrypted by an encrypting version of the fourth key;

decrypt the second video encrypted by the encrypting version of fourth key using the decrypting version of the fourth key to obtain the second video;

reformat the second video to generate a second reformatted video having the second format;

send the second reformatted video to the second compute device; and delete the fourth key in response to reformatting the second video to generate the second reformatted video.

13. A non-transitory, processor-readable medium storing instructions that, when executed by a processor, cause the processor to:

receive, at a first compute device, from a second compute device, and in response to the second compute device requesting a video, a subkey, the video having a first format, the second compute device configured to play videos having a second format and not configured to play videos having the first format, the second compute device configured to decrypt an encrypted version of the subkey to obtain the subkey, the first compute device not configured to decrypt the encrypted version of the subkey;

receive an encrypted video including an encrypted version of the video;

decrypt the encrypted video using the subkey to obtain the video; and modify the video to generate a modified video having the second format, the modifying the video to generate the modified video including obfuscating an identifier.

14. The non-transitory, processor-readable medium of claim 13, wherein the non-transitory, processor-readable medium further stores instructions that, when executed by the processor, cause the processor to:

encrypt the modified video to generate an encrypted modified video; and send the encrypted modified video to the second compute device.

15. The non-transitory, processor-readable medium of claim 13, wherein the non-transitory, processor-readable medium further stores instructions that, when executed by the processor, cause the processor to:

delete the subkey in response to passage of a predefined period of time.

16. The non-transitory, processor-readable medium of claim 13, wherein the non-transitory, processor-readable medium further stores instructions that, when executed by the processor, cause the processor to:

receive a request to save or copy the subkey; and in response to receiving the request to save or copy the subkey, delete the subkey.

17. The non-transitory, processor-readable medium of claim 13, wherein the identifier is at least one of a face or a license plate.

18. The non-transitory, processor-readable medium of claim 13, wherein the video is a first video, the subkey is a first subkey, the encrypted video is a first encrypted video, the modified video is a first modified video, and the non-transitory, processor-readable medium further stores instructions that, when executed by the processor, cause the processor to:

receive, at the first compute device, from the second compute device, and in response to the second compute device requesting a second video, a second subkey, the second video having the first format, the second compute device configured to decrypt an encrypted version of the second subkey to obtain the second subkey, the first compute device not configured to decrypt the encrypted version of the second subkey;

receive a second encrypted video including an encrypted version of the second video;

decrypt the second encrypted video using the second subkey to obtain the second video; and modify the second video to generate a second modified video having the second format.

19. The non-transitory, processor-readable medium of claim 13, wherein the subkey is generated in response to generating the video.

20. The non-transitory, processor-readable medium of claim 13, wherein the subkey is generated concurrently with generating the video.

21. The non-transitory, processor-readable medium of claim 13, wherein the video is a first video captured by a first camera, and the first video is a portion of a composite video that includes a second video captured by a second camera different than the first camera.

22. The non-transitory, processor-readable medium of claim 13, wherein the video is a first video having a first quality, and the first video is a portion of a composite video that includes a second video having a second quality different than the first quality.

* * * * *